(12) United States Patent
Kang et al.

(10) Patent No.: US 11,659,590 B2
(45) Date of Patent: May 23, 2023

(54) APPARATUS AND METHOD FOR HANDLING COLLISIONS OF TRANSMISSIONS IN WIRELESS COMMUNICATION SYSTEM

(71) Applicant: Samsung Electronics Co., Ltd., Gyeonggi-do (KR)

(72) Inventors: Hyunjeong Kang, Gyeonggi-do (KR); Anil Agiwal, Gyeonggi-do (KR)

(73) Assignee: Samsung Electronics Co., Ltd

( * ) Notice: Subject to any disclaimer, the term of this patent is extended or adjusted under 35 U.S.C. 154(b) by 288 days.

(21) Appl. No.: 16/986,713

(22) Filed: Aug. 6, 2020

(65) Prior Publication Data

US 2021/0045138 A1     Feb. 11, 2021

(30) Foreign Application Priority Data

Aug. 6, 2019   (KR) .......................... 10-2019-0095609
Nov. 6, 2019   (KR) .......................... 10-2019-0141099

(51) Int. Cl.
*H04W 72/566*   (2023.01)
*H04W 52/34*    (2009.01)
(Continued)

(52) U.S. Cl.
CPC ......... *H04W 72/569* (2023.01); *H04W 52/34* (2013.01); *H04W 52/383* (2013.01); *H04W 72/02* (2013.01)

(58) Field of Classification Search
CPC . H04W 52/383; H04W 52/281; H04W 72/02; H04W 52/34; H04W 72/1242;
(Continued)

(56) References Cited

U.S. PATENT DOCUMENTS 10,405,327 B2   9/2019   Loehr et al.
2018/0234995 A1  8/2018   Jung et al.
(Continued)

FOREIGN PATENT DOCUMENTS

EP    3 518 589       7/2019
KR    20170110069    10/2017

OTHER PUBLICATIONS

CATT, "Prioritization of Uu and SL for NR V2X", R2-195803, 3GPP TSG-RAN WG2 Meeting #106, May 13-17, 2019, 6 pages.
(Continued)

*Primary Examiner* — Oussama Roudani
(74) *Attorney, Agent, or Firm* — The Farrell Law Firm, P.C.

(57) ABSTRACT

The disclosure relates to a 5$^{th}$ generation (5G) or pre-5G communication system for supporting a higher data transmission rate, which is subsequent to the 4$^{th}$ generation (4G) system such as long-term evolution (LTE). An operation method of a terminal in a wireless communication system includes identifying a priority between uplink (UL) data and sidelink data; if the terminal is not capable of simultaneous transmissions of the UL data and the sidelink data, transmitting only first data, wherein the first data has a higher priority between the UL data and the sidelink data; and if a total transmission power of the UL data and the sidelink data exceeds a maximum output power, transmitting both the first data and second data, of which a transmission power is identified based on the maximum output power, wherein the second data has a lower priority between the UL data and the sidelink data.

18 Claims, 35 Drawing Sheets

(51) Int. Cl.
*H04W 52/38* (2009.01)
*H04W 72/02* (2009.01)

(58) Field of Classification Search
CPC ............ H04W 52/146; H04W 52/367; H04W 72/1284
See application file for complete search history.

(56) References Cited

U.S. PATENT DOCUMENTS

| | | | |
|---|---|---|---|
| 2019/0098657 A1* | 3/2019 | Golitschek Edler von Elbwart ... | H04W 72/1284 |
| 2020/0045724 A1* | 2/2020 | Lu ..................... | H04W 28/0289 |
| 2021/0105790 A1* | 4/2021 | Lin .................. | H04W 72/0446 |
| 2021/0377871 A1* | 12/2021 | Zhao ................. | H04W 72/1263 |
| 2022/0103298 A1* | 3/2022 | Lee ....................... | H04W 72/23 |
| 2022/0124776 A1* | 4/2022 | Li ......................... | H04L 1/0008 |

OTHER PUBLICATIONS

OPPO, "Left Issues on MAC for NR-V2X", R2-1905568, 3GPP TSG-RAN WG2 Meeting #106, May 13-17, 2019, 6 pages.
Vivo, "Uplink and Sidelink Transmission Prioritization in NR V2X", R2-1905847, 3GPP TSG-RAN WG2 Meeting #106, May 13-17, 2019, 8 pages.
MediaTek Inc., "Prioritization of UL and SL Transmission", R2-1906337, 3GPP TSG-RAN WG2 Meeting #106, May 13-17, 2019, 3 pages.
International Search Report dated Nov. 25, 2020 issued in counterpart application No. PCT/KR2020/010438, 6 pages.
3rd Generation Partnership Project; Technical Specification Group Radio Access Network; Evolved Universal Terrestrial Radio Access (E-UTRA); Medium Access Control (MAC) protocol specification (Release 14).
European Search Report dated Aug. 31, 2022 issued in counterpart application No. 20849325.4-1215, 6 pages.

* cited by examiner

| PC5-RRC | | PC5-S | | SL DRB | | SL-FCH |

FIG.8A

| SL MAC CE | PC5-S | SL DRB |

| SL MAC CE | PC5-RRC | SL DRB |

| SL MAC CE | PC5-RRC | PC5-S |

| SL DRB | PC5-RRC | PC5-S |

FIG.8C

| SL MAC CE | SL DRB | PC5-RRC | PC5-S |

FIG.8D

| UL SRB | UL DRB | | PUCCH |

FIG.8E

| UL MAC CE | UL SRB | UL DRB |

FIG.8G

APPARATUS AND METHOD FOR HANDLING COLLISIONS OF TRANSMISSIONS IN WIRELESS COMMUNICATION SYSTEM

CROSS-REFERENCE TO RELATED APPLICATION(S)

This application is based on and claims priority under 35 U.S.C. § 119 to Korean Patent Application No. 10-2019-0095609, filed on Aug. 6, 2019, in the Korean Intellectual Property Office, and Korean Patent Application No. 10-2019-0141099, filed on Nov. 6, 2019, in the Korean Intellectual Property Office, the disclosures of which are incorporated by reference herein in their entireties.

BACKGROUND

1. Field

The disclosure relates generally to a wireless communication system, and particularly, to an apparatus and method for handling collisions of transmissions in a wireless communication system.

2. Description of Related Art

To meet the demand for wireless data traffic having increased since the deployment of 4th generation (4G) communication systems, efforts have been made to develop an improved 5th generation (5G) or pre-5G communication system. Therefore, the 5G or pre-5G communication system is also called a "beyond 4G network" or a "post long term evolution (LTE) system".

The 5G communication system is considered to be implemented in higher frequency (millimeter wave (mmWave)) bands, e.g., 28 gigahertz (GHz) or 60 GHz bands, so as to accomplish higher data rates. To decrease propagation loss of the radio waves and increase the transmission distance, beam forming, massive multiple-input multiple-output (MIMO), full dimensional MIMO (FD-MIMO), array antenna, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), and reception-end interference cancellation.

In the 5G system, hybrid frequency shift keying (FSK), quadrature amplitude modulation (FQAM), sliding window superposition coding (SWSC) as an advanced coding modulation (ACM), filter bank multi carrier (FBMC) technology, non-orthogonal multiple access (NOMA) technology, and sparse code multiple access (SCMA) as an advanced access technology have been developed.

In addition, vehicle communication using a 5G communication system (vehicle-to-everything) (hereinafter, referred to as "V2X") is under development, and is expected to provide users with various services using V2X.

SUMMARY

The present disclosure has been made to address the above-mentioned problems and disadvantages, and to provide at least the advantages described below.

In accordance with an aspect of the disclosure, an operation method of a terminal in a wireless communication system includes identifying a priority between uplink (UL) data and sidelink data; if the terminal is not capable of simultaneous transmissions of the UL data and the sidelink data, transmitting only first data, wherein the first data has a higher priority between the UL data and the sidelink data; and if a total transmission power of the UL data and the sidelink data exceeds a maximum output power, transmitting both the first data and second data, of which a transmission power is identified based on the maximum output power, wherein the second data has a lower priority between the UL data and the sidelink data.

In accordance with another aspect of the disclosure, a terminal in a wireless communication system comprises a transmitter and a processor. The processor is configured to identify a priority between UL data and sidelink data; using the transmitter, transmit first data, wherein the first data has a higher priority between the UL data and the sidelink data; and if the terminal is not capable of simultaneous transmissions of the UL data and the sidelink data, transmit only the first data, wherein the first data has a higher priority between the UL data and the sidelink data; and if a total transmission power of the UL data and the sidelink data exceeds a maximum output power, transmit both the first data and second data, of which a transmission power is identified based on the maximum output power, wherein the second data has a lower priority between the UL data and the sidelink data.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A illustrates combinations of data transmitted through an UL or a sidelink in a wireless communication system, according to an embodiment;

FIG. 8C illustrates combinations of data transmitted through an UL or a sidelink in a wireless communication system, according to an embodiment;

FIG. 8D illustrates combinations of data transmitted through an UL or a sidelink in a wireless communication system, according to an embodiment;

FIG. 8E illustrates combinations of data transmitted through an UL or a sidelink in a wireless communication system, according to an embodiment;

FIG. 8G illustrates combinations of data transmitted through an UL or a sidelink in a wireless communication system, according to an embodiment;

DETAILED DESCRIPTION

Figure 1:
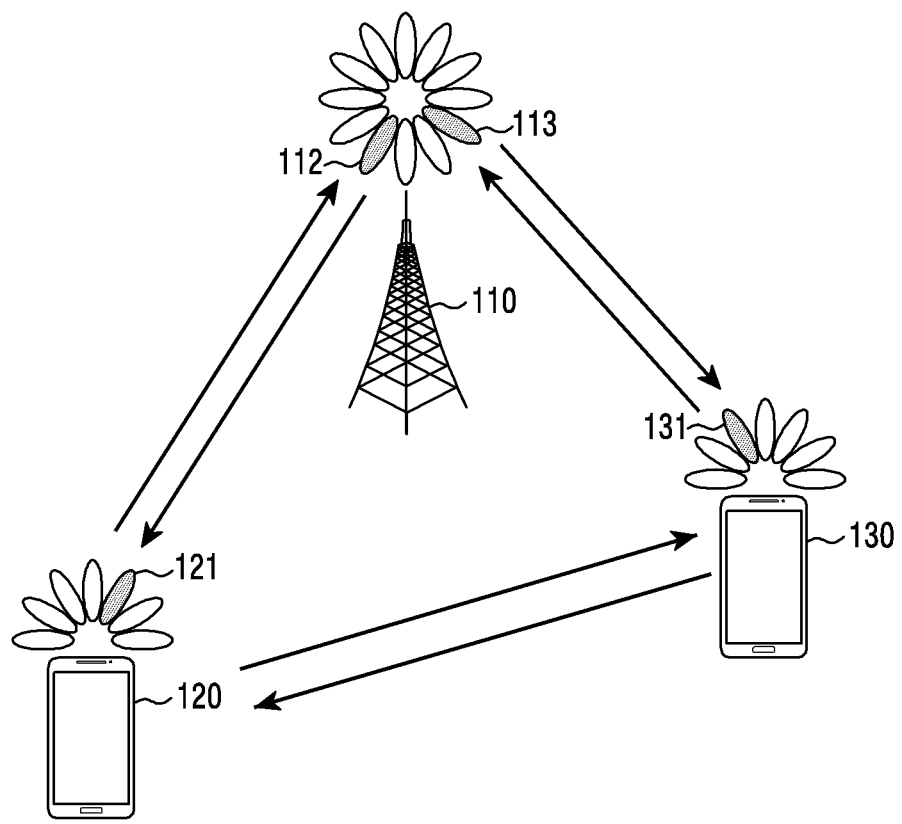
FIG. 1 illustrates a wireless communication system, according to an embodiment.

The disclosure provides an apparatus and a method for determining transmission priority of data between UL transmission and sidelink transmission in a wireless communication system.

In addition, the disclosure provides an apparatus and a method for configuring the transmission priority of data between UL transmission and sidelink transmission in a wireless communication system.

An apparatus and a method according to an embodiment are capable of effectively avoiding collisions (i.e., interference) between transmissions.

The terms used herein are intended to merely describe a specific embodiment, and may not be intended to limit the scope of other embodiments. A singular expression may include a plural expression unless explicitly stated otherwise in context. Terms used herein, including technical or scientific terms, may have the same meaning as commonly understood by those skilled in the art to which the disclosure pertains. Among the terms used herein, the terms defined in general dictionaries may be interpreted as having the same meaning or a similar meaning in the context of the related art, and are not to be interpreted as having an ideal or excessively formal meaning, unless explicitly defined in the disclosure. In some cases, the terms cannot be interpreted to exclude embodiments even if they are defined herein.

Hereinafter, examples will be described from a hardware-based approach in an embodiment. However, an embodiment encompasses techniques using both hardware and software, and thus, an embodiment is not intended to exclude a software-based approach.

The disclosure below relates to an apparatus and a method for selecting resources in a wireless communication system. Specifically, the disclosure is intended to select a transmission resource of a terminal in sidelink communication between terminals. The disclosure relates to a method and an apparatus for selecting at least one resource pool for performing communication in the case where a plurality of resource pools is configured for sidelink communication.

Hereinafter, terms referring to signals, terms referring to channels, terms referring to control information, terms referring to network entities, and terms referring to elements of an apparatus, which are used herein, will be used as examples for convenience of explanation. Therefore, the disclosure is not limited to the terms used herein, and other terms having equivalent technical meanings may be used.

In the following description, physical channels and signals may be interchangeably used with data or control signals. For example, although a physical downlink shared channel (PDSCH) is a term indicating a physical channel through which data is transmitted, PDSCH may also be used to indicate data. That is, the expression "transmit a physical channel" may be interpreted as "transmit data or signals through a physical channel".

In the following description, higher layer signalling indicates a method of transmitting a signal from a base station to a terminal using a DL data channel in a physical layer or transmitting a signal from a terminal to a base station using a UL data channel in a physical layer. The higher layer signalling may also be understood as radio resource control (RRC) signalling or a media access control (MAC) control element (CE).

In addition, although the expression "more than" or "less than" may be used herein in order to determine whether or not a specific condition is satisfied or fulfilled, this is only for describing an example and does not exclude the expression "equal to or greater than", "equal to or less than", "greater than or equal to", or "less than or equal to". The expression "equal to or greater than" may be replaced with "more than", and the expression "equal to or less than" may be replaced with "less than".

Further, in the disclosure, although an embodiment will be described using terms used in a specific communication standard (e.g., $3^{rd}$ generation partnership project (3GPP)), this is only an example for explanation. An embodiment may also be easily modified and applied to other communication systems.

FIG. 1 illustrates a wireless communication system, according to an embodiment.

FIG. 1 illustrates a base station 110, a first terminal 120, and a second terminal 130 as parts of nodes using wireless channels in a wireless communication system. Although a single base station is illustrated in FIG. 1, other base stations that are the same as or similar to the base station 110 may be further included.

The base station 110 is network infrastructure that provides wireless access to the first terminal 120 and the second terminal 130. The base station 110 has a coverage defined as a specific geographic area, based on the distance over which signals can be transmitted. The base station 110 may be referred to as an access point (AP), an eNodeB (eNB), a 5G node, a next-generation nodeB (gNB), a wireless point, a transmission/reception point (TRP), or other terms having equivalent technical meanings.

The first terminal 120 and the second terminal 130 are each a device used by a user and communicates with the base station 110 through wireless channels. The link from the base station 110 to the first terminal 120 and the second terminal 130 is called a DL (DL), and the link from the first terminal 120 and the second terminal 130 to the base station 110 is called an UL. In addition, the first terminal 120 and the second terminal 130 may communicate with each other through a wireless channel. In this case, the link between the first terminal 120 and the second terminal 130 is called a sidelink, and the sidelink may be interchangeably used with a PC5 interface. In some cases, at least one of the first terminal 120 and the second terminal 130 may be operated without user involvement. That is, at least one of the first terminal 120 and the second terminal 130 may be a device for performing machine-type communication (MTC), and may not be carried by a user. Each of the first terminal 120 and the second terminal 130 may be referred to a terminal, as user equipment (UE), a mobile station, a subscriber station, a remote terminal, a wireless terminal, a user device, or other terms having equivalent technical meanings.

The base station 110, the first terminal 120, and the second terminal 130 may transmit and receive radio signals in an mmWave band (e.g., 28 GHz, 30 GHz, 38 GHz, or 60 GHz). In this case, in order to improve a channel gain, the base station 110, the first terminal 120, and the second terminal 130 may perform beamforming. Here, beamforming may include transmission beamforming and reception beamforming. That is, the base station 110, the first terminal 120, and the second terminal 130 may provide directivity to a transmission signal or a reception signal. To this end, the base station 110, and the first terminal 120 and the second terminal 130, may select serving beams 112, 113, 121, and 131 through a beam searching or beam management procedure. After the serving beams 112, 113, 121, and 131 are selected, subsequent communication may be performed through resources in a quasi co-located (QCL) relationship with the resources that transmit the serving beams 112, 113, 121, and 131.

If the large-scale characteristics of the channel that transmits the symbol in a first antenna port is able to be inferred from the channel that transmits the symbol in a second antenna port, the first antenna port and the second antenna port may be regarded as being in a QCL relationship. For example, the large-scale characteristics may include at least one of delay spread, Doppler spread, Doppler shift, average gain, average delay, and spatial receiver parameters.

The first terminal 120 and the second terminal 130 shown in FIG. 1 may support vehicle communication. In the case of vehicle communication, in an LTE system, the standardization for V2X technology has been completed based on a device-to-device (D2D) communication structure in 3GPP Release 14 and Release 15, and efforts are underway to develop V2X technology based on a 5G NR. The NR V2X is expected to support unicast communication, groupcast (or multicast) communication, and broadcast communication between terminals. In addition, unlike the LTE V2X that aims to transmit and receive basic safety information required for road driving of vehicles, the NR V2X aims to provide more advanced services such as platooning, advanced driving, extended sensors, and remote driving.

The V2X services may be divided into basic safety services and advanced services. The basic safety services may include detailed services such as a left-turn awareness service, a front-vehicle collision warning service, an emergency vehicle approach awareness service, a front-obstacle warning service, and an intersection traffic light information service, as well as a cooperative awareness message (CAM) service or a basic safety message (BSM) service, and V2X information may be transmitted and received using a broadcast, unicast, or groupcast transmission method. The advanced services require, as well as more enhanced quality-of-service (QoS) requirements than the basic safety services, a method capable of transmitting and receiving V2X information using the unicast and groupcast transmission methods, in addition to the broadcast transmission method, in order to transmit and receive V2X information within a specific vehicle group or to transmit and receive V2X information between two vehicles. The advanced services may include detailed services such as a cluster driving service, an autonomous driving service, a remote-controlled driving service, and an extended sensor-based V2X service.

Hereinafter, a "sidelink (SL)" refers to a signal transmission/reception path between terminals, and may be interchangeably used with a PC5 interface. Hereinafter, the base station is an entity that performs allocation of resources to the terminal, and may support both V2X communication and normal cellular communication, or may support only V2X communication. That is, the base station may be an NR base station (e.g., a gNB), an LTE base station (e.g., an eNB), or a road side unit (RSU). The terminal may include, in addition to normal user equipment and a mobile station, a vehicle supporting vehicular-to-vehicular (V2V) communication, a vehicle or a pedestrian handset (e.g., a smartphone) supporting vehicular-to-pedestrian (V2P) communication, a vehicle supporting vehicular-to-network (V2N) communication, a vehicle supporting vehicular-to-infrastructure (V2I) communication, an RSU equipped with terminal functions, an RSU equipped with base station functions, and an RSU equipped with some base station functions and some terminal functions. In addition, the "V2X terminal" used in the description below may be referred to as a "terminal". That is, the terminal may be used as the V2X terminal in relation to V2X communication.

The base station and the terminal are connected through a Uu interface. A "UL" indicates a wireless link through which the terminal transmits data or control signals to the base station, and a "DL (DL)" indicates a wireless link through which the base station transmits data or control signals transmitted to the terminal.

Figure 2:
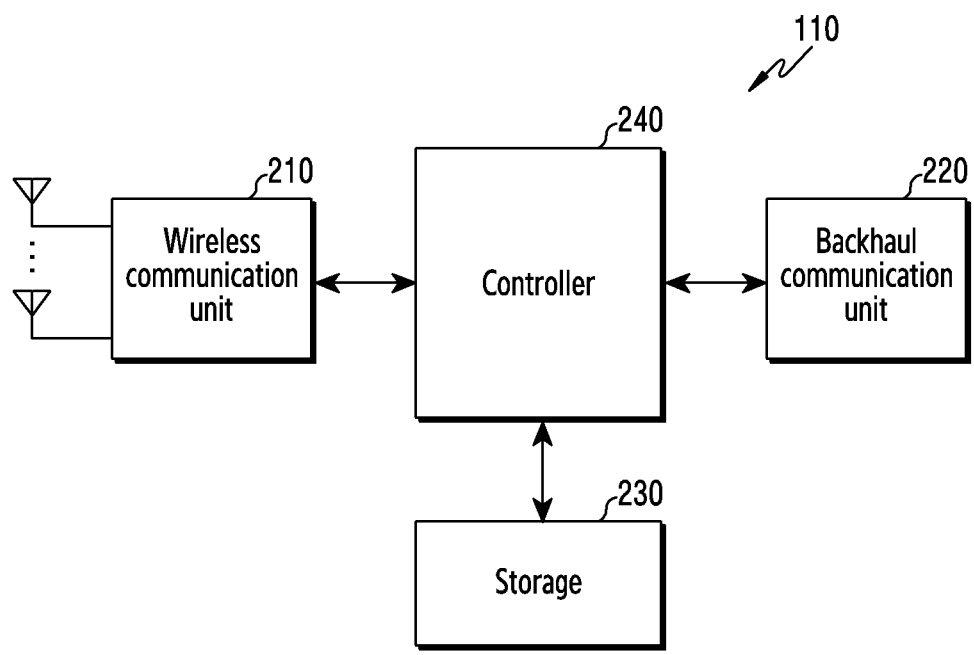
FIG. 2 illustrates the configuration of a base station in a wireless communication system, according to an embodiment.

FIG. 2 illustrates the configuration of a base station in a wireless communication system, according to an embodiment. The configuration illustrated in FIG. 2 may be regarded as the configuration of the base station 110. Hereinafter, terms ending in "unit", "or" or "er", denote a unit for processing at least one function or operation, and may be implemented as hardware, software, or a combination thereof.

Referring to FIG. 2, the base station includes a wireless communication unit 210, a backhaul communication unit 220, a storage 230, and a controller 240.

The wireless communication unit 210 performs functions of transmitting and receiving signals via wireless channels. For example, the wireless communication unit 210 performs a function of transformation between a baseband signal and a bit stream according to the physical layer standard of a system. For example, when transmitting data, the wireless communication unit 210 produces complex symbols by encoding and modulating a transmission bit stream. In addition, when receiving data, the wireless communication unit 210 restores a reception bit stream by demodulating and decoding a baseband signal.

In addition, the wireless communication unit 210 up-converts a baseband signal to a radio frequency (RF) band signal to thus transmit the same via an antenna, and down-converts an RF band signal received via the antenna to a baseband signal. To this end, the wireless communication unit 210 may include a transmitting filter, a receiving filter, an amplifier, a mixer, an oscillator, a digital-to-analog convertor (DAC), and an analog-to-digital convertor (ADC). In addition, the wireless communication unit 210 may include a plurality of transmission/reception paths. Further, the wireless communication unit 210 may include at least one antenna array including a plurality of antenna elements.

In terms of hardware, the wireless communication unit 210 may include a digital unit and an analog unit, and the analog unit may include a plurality of sub-units depending on the operation power, or the operation frequency. The digital unit may be implemented as at least one processor (e.g., a digital signal processor (DSP)).

The wireless communication unit 210 transmits and receives signals as described above. Accordingly, all or part of the wireless communication unit 210 may be referred to as a "transmitter", a "receiver", or a "transceiver". In the following description, the transmission and reception performed via wireless channels will have a meaning encompassing the execution of the process by the wireless communication unit 210 as described above.

The backhaul communication unit 220 provides an interface for communication with other nodes in the network. That is, the backhaul communication unit 220 converts a bit stream, transmitted from the base station to another node, such as another access node, another base station, an upper node, or a core network, into a physical signal, and converts a physical signal received from another node into a bit stream.

The storage 230 stores data such as fundamental programs, application programs, and configuration information for the operation of the base station. The storage 230 may be configured as volatile memory, non-volatile memory, or a combination thereof. In addition, the storage 230 provides the stored data in response to a request from the controller 240.

The controller 240 controls the overall operation of the base station. For example, the controller 240 transmits and receives signals via the wireless communication unit 210 or the backhaul communication unit 220. The controller 240 writes or reads data to or from the storage 230. In addition, the controller 240 may perform the functions of a protocol stack required for the communication standard. The protocol stack may be included in the wireless communication unit 210. To this end, the controller 240 may include at least one processor. The controller 240 may control the base station to perform operations according to an embodiment described below.

Figure 3:
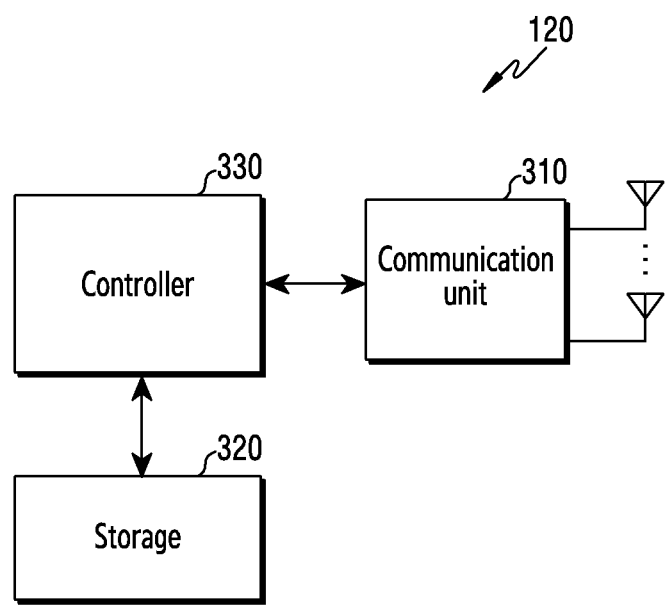
FIG. 3 illustrates the configuration of a terminal in a wireless communication system, according to an embodiment.

FIG. 3 illustrates the configuration of a terminal in a wireless communication system, according to an embodiment. The configuration illustrated in FIG. 3 may be regarded as the configuration of the terminal 120. Hereinafter, terms ending in "unit", "or", or "er", denote a unit for processing at least one function or operation, and may be implemented by hardware, software, or a combination thereof.

Referring to FIG. 3, the terminal includes a communication unit 310, a storage 320, and a controller 330.

The communication unit 310 performs functions of transmitting and receiving signals via wireless channels. For example, the communication unit 310 performs a function of transformation between a baseband signal and a bit stream according to the physical layer standard of a system. For example, when transmitting data, the communication unit 310 produces complex symbols by encoding and modulating a transmission bit stream. In addition, when receiving data, the communication unit 310 restores a reception bit stream by demodulating and decoding a baseband signal. In addition, the communication unit 310 up-converts a baseband signal to an RF band signal to thus transmit the same via an antenna, and down-converts an RF band signal received via the antenna to a baseband signal. For example, the communication unit 310 may include a transmitting filter, a receiving filter, an amplifier, a mixer, an oscillator, a digital to analog converter DAC, and an analog to digital converter ADC.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit (e.g., a radio frequency integrated circuit (RFIC)). The digital circuit and the analog circuit may be implemented as a single package. In addition, the communication unit 310 may include a plurality of RF chains. Further, the communication unit 310 may perform beamforming.

The communication unit 310 transmits and receives signals as described above. Accordingly, all or part of the communication unit 310 may be referred to as a "transmitter", a "receiver", or a "transceiver". In the following description, transmission and reception performed via a wireless channel will have a meaning encompassing execution of the process by the communication unit 310 as described above.

The storage 320 stores data such as fundamental programs for the operation of the terminal, application programs, and data such as configuration information. The storage 320 may be configured as volatile memory, non-volatile memory, or a combination thereof. In addition, the storage 320 provides the stored data in response to a request from the controller 330.

The controller 330 controls the overall operation of the terminal. For example, the controller 330 transmits and receives signals via the communication unit 310. In addition, the controller 330 writes or reads data to or from the storage 320. The controller 330 also performs the functions of a protocol stack required for the communication standard. To this end, the controller 330 may include at least one processor or microprocessor, or may be a part of a processor. In addition, a part of the communication unit 310 and the controller 330 may be referred to as a communication processor. The controller 330 may control the terminal to perform operations according to an embodiment described below.

Figure 4:
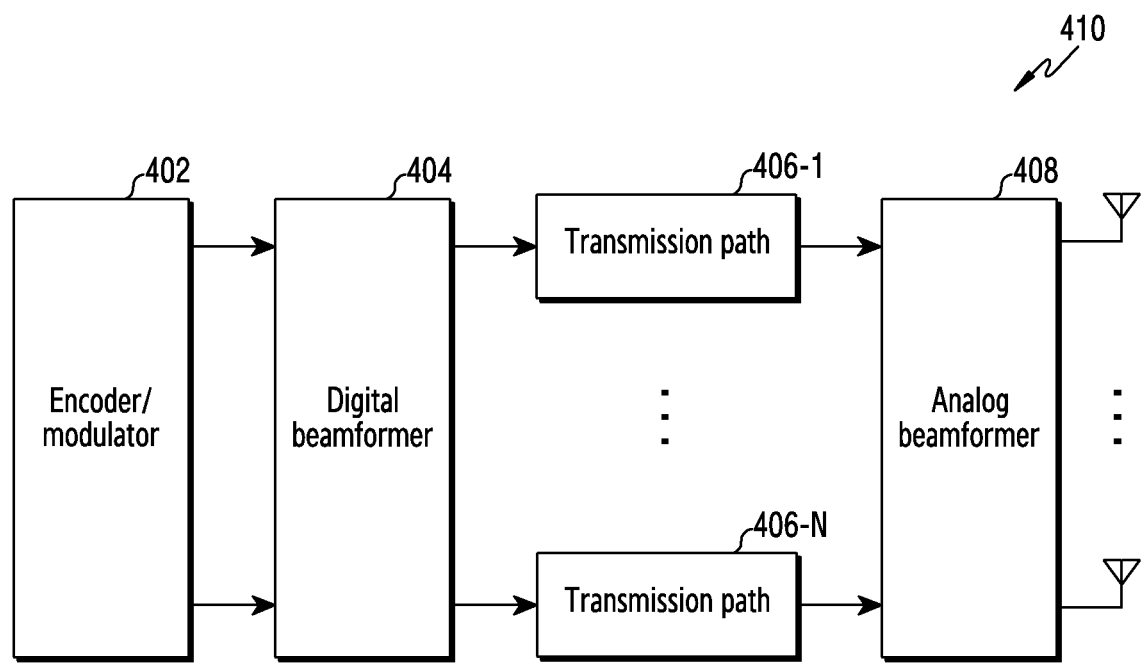
FIG. 4 illustrates the configuration of a communication unit in a wireless communication system, according to an embodiment.

FIG. 4 illustrates the configuration of a communication unit in a wireless communication system, according to an embodiment. FIG. 4 illustrates elements for performing beamforming as a part of the wireless communication unit.

Referring to FIG. 4, the wireless communication unit 410 includes an encoder/modulator 402, a digital beamformer 404, a plurality of transmission paths 406-1 to 406-N, and an analog beamformer 408.

The encoder/modulator 402 performs channel encoding. For channel encoding, at least one of a low density parity check (LDPC) code, a convolution code, and a polar code may be used. The encoder/modulator 402 performs constellation mapping, thereby producing modulation symbols.

The digital beamformer 404 performs beamforming on digital signals (e.g., modulation symbols). To this end, the digital beamformer 404 multiplies the modulation symbols by beamforming weights. Here, the beamforming weight may be used to change the magnitude and phase of a signal, and may be referred to as a "precoding matrix" or a "precoder". The digital beamformer 404 outputs digitally-beamformed modulation symbols to the plurality of transmission paths 406-1 through 406-N. In this case, according to an MIMO transmission scheme, modulation symbols may be multiplexed, or the same modulation symbols may be provided to the plurality of transmission paths 406-1 to 406-N.

The plurality of transmission paths 406-1 to 406-N convert the digitally-beamformed digital signals into analog signals. To this end, each of the plurality of transmission paths 406-1 to 406-N may include an inverse fast Fourier transform (IFFT) operator, a cyclic prefix (CP) inserter, a DAC, and an up-converter. The CP inserter is intended for an orthogonal frequency division multiplexing (OFDM) scheme, and may be excluded in the case where other physical layer schemes (e.g., a filter bank multi-carrier (FBMC)) are applied. That is, the plurality of transmission paths 406-1 to 406-N provide an independent signal processing process to multiple streams produced through digital beamforming. However, depending on the implementation methods, some of the elements of the plurality of transmission paths 406-1 to 406-N may be used in common.

The analog beamformer 408 performs beamforming on the analog signals. To this end, the digital beamformer 404 multiplies the analog signals by beamforming weights. Here, the beamforming weight is used to change the magnitude and phase of a signal. Specifically, the analog beamformer 408 may be configured in various ways depending on the connection structure between the plurality of transmission paths 406-1 to 406-N and antennas. For example, each of the plurality of transmission paths 406-1 to 406-N may be connected to one antenna array, or the plurality of transmission paths 406-1 to 406-N may be connected to one antenna array. Additionally or alternatively, the plurality of transmission paths 406-1 to 406-N may be adaptively connected to one antenna array or two or more antenna arrays.

Figure 5:
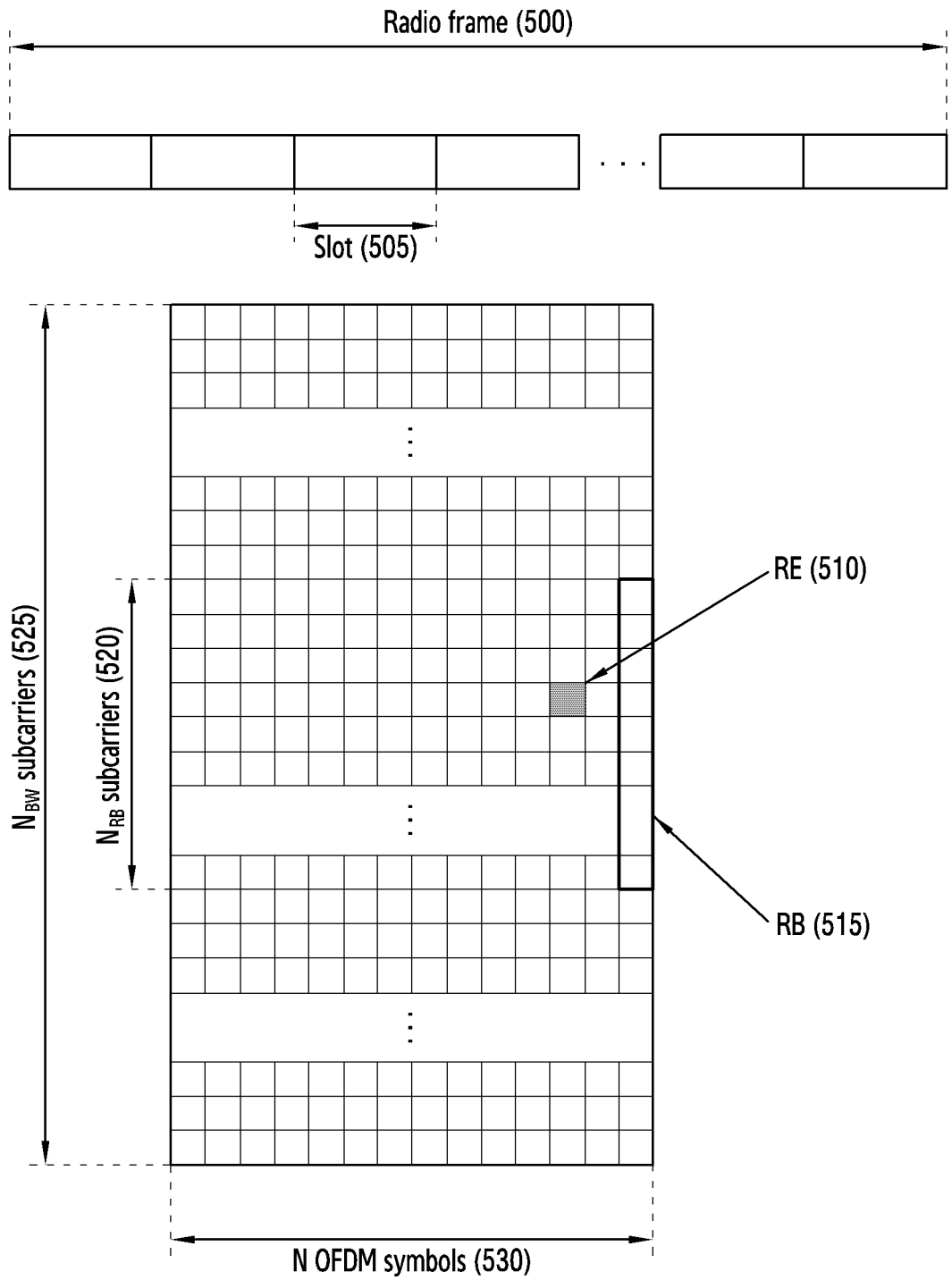
FIG. 5 illustrates the structure of radio time-frequency resources in a wireless communication system, according to an embodiment.

FIG. 5 illustrates the structure of radio time-frequency resources in a wireless communication system, according to an embodiment.

Referring to FIG. 5, in a radio resource domain, the horizontal axis indicates a time domain, and the vertical axis indicates a frequency domain. The minimum transmission unit in the time domain is an OFDM symbol or a discrete Fourier transform spread (DFT-S)-OFDM symbol, and $N_{symb}$ OFDM symbols or DFT-S-OFDM symbols 530 are included in one slot 505. Unlike the slot, the length of a subframe in an NR system may be defined as 1.0 millisecond (ms), and the length of a radio frame 500 may be defined as 10 ms. The minimum transmission unit in the frequency domain is a subcarrier, and the entire system transmission bandwidth may include a total of $N_{BW}$ subcarriers 525. Specific values of $N_{symb}$ and $N_{BW}$ may be variably applied depending on the system.

The basic unit in the time-frequency resource domain is a resource element (RE) 510, which may be indicated by an OFDM symbol index or a DFT-S-OFDM symbol index and a subcarrier index. A resource block (RB) 515 may be defined by $N_{RB}$ consecutive subcarriers 520 in the frequency domain. In general, the minimum transmission unit of data is an RB unit. In the NR system, in general, $N_{symb}=14$ and $N_{RB}=12$.

The structure of the radio time-frequency resources shown in FIG. 5 is applied to a Uu interface. In addition, the structure of the radio time-frequency resources shown in FIG. 5 may be applied to the sidelink in a similar manner.

Figure 6A:
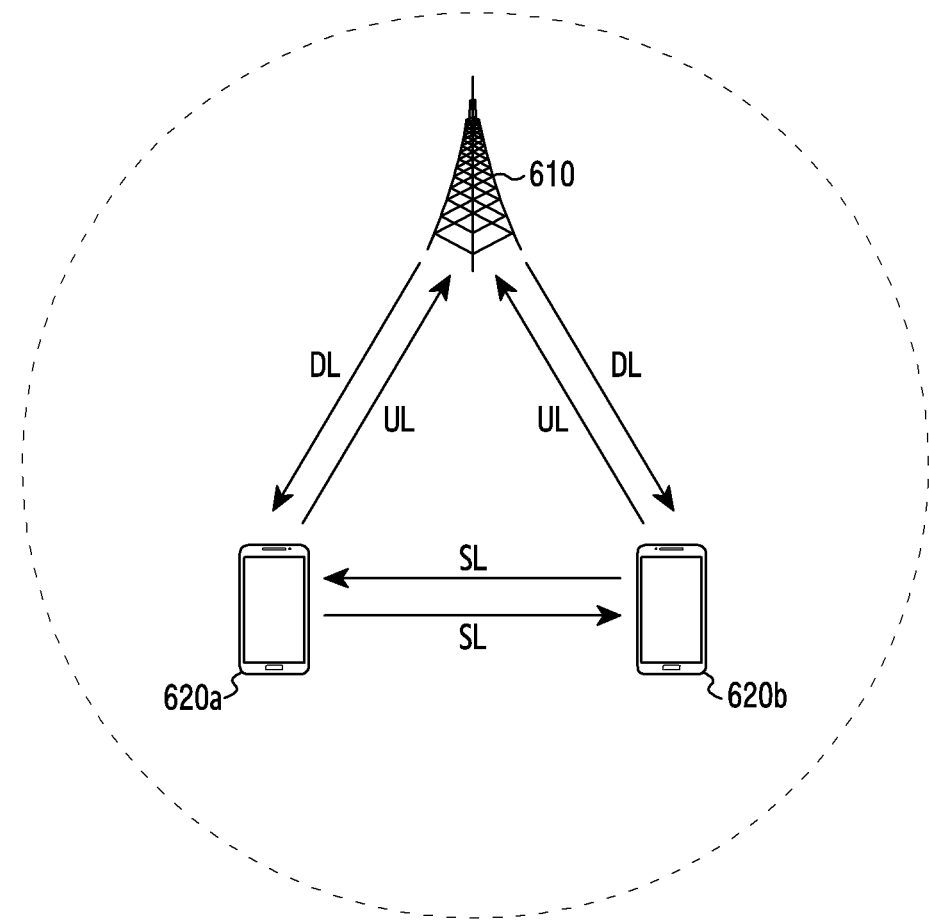
FIG. 6A illustrates an example of a scenario for sidelink communication in a wireless communication system, according to an embodiment.
Figure 6B:
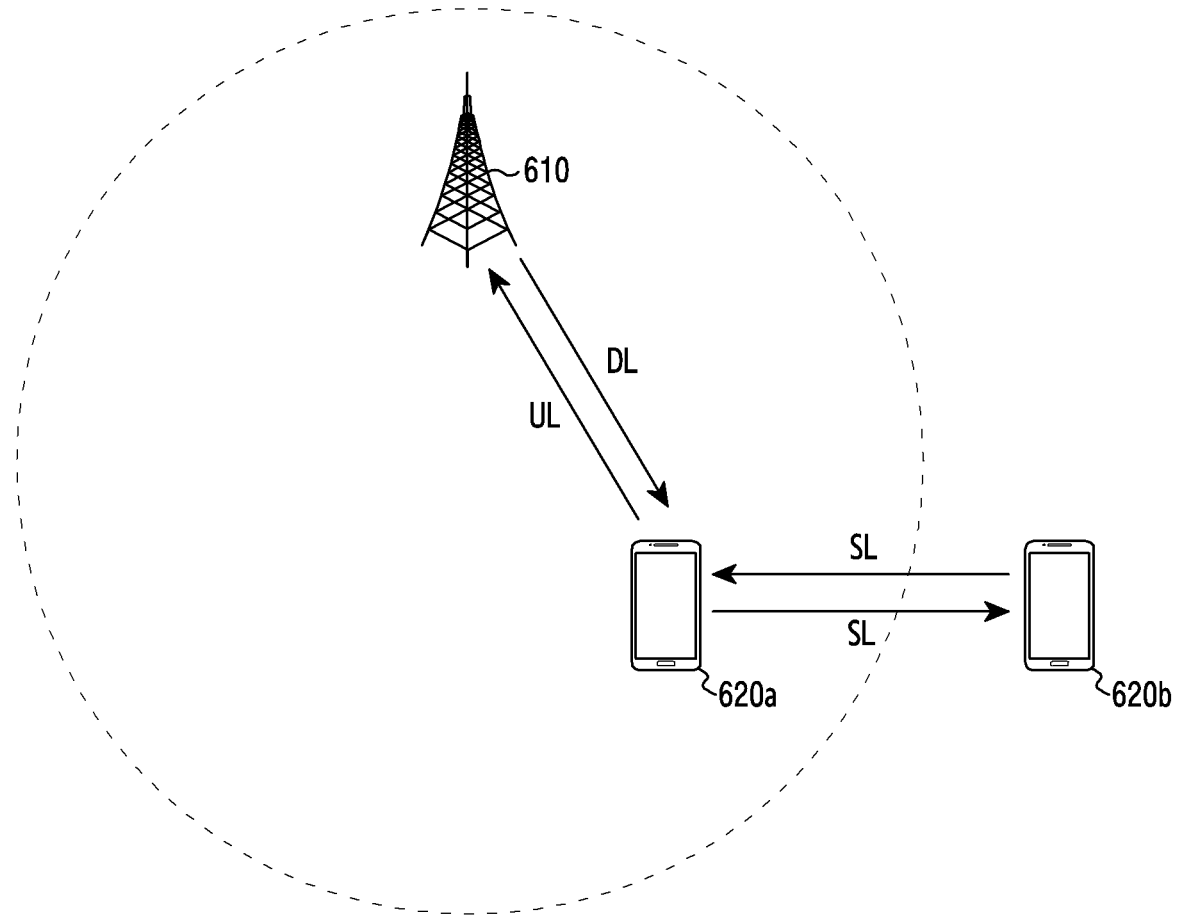
FIG. 6B illustrates an example of a scenario for sidelink communication in a wireless communication system, according to an embodiment.
Figure 6C:
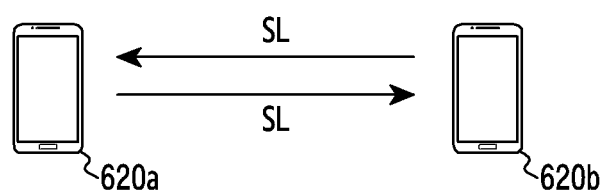
FIG. 6C illustrates an example of a scenario for sidelink communication in a wireless communication system, according to an embodiment.
Figure 6D:
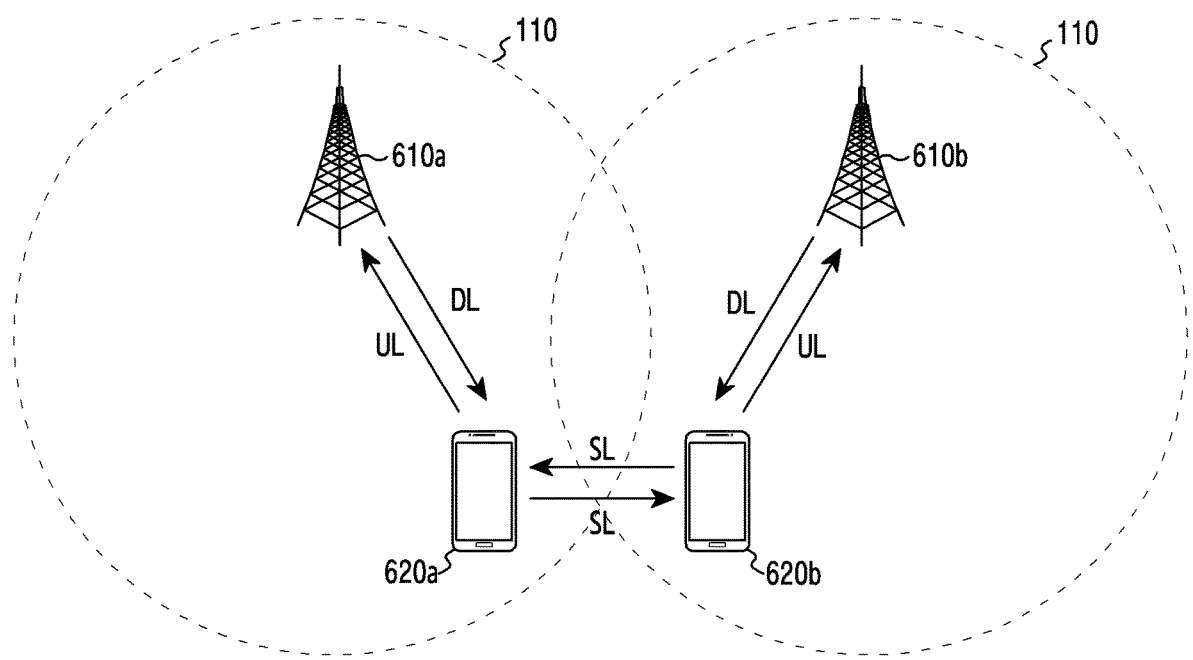
FIG. 6D illustrates an example of a scenario for sidelink communication in a wireless communication system, according to an embodiment.

FIG. 6A illustrates an example of a scenario for sidelink communication in a wireless communication system, according to an embodiment. FIG. 6B illustrates an example of a scenario for sidelink communication in a wireless communication system, according to an embodiment. FIG. 6C illustrates an example of a scenario for sidelink communication in a wireless communication system, according to an embodiment. FIG. 6D illustrates an example of a scenario for sidelink communication in a wireless communication system, according to an embodiment.

FIG. 6A illustrates an in-coverage scenario in which a first sidelink terminal 620a and a second sidelink terminal 620b are located within the coverage of the base station 610. The first sidelink terminal 620a and the second sidelink terminal 620b may receive data and control information from the base station 610 through a DL, or may transmit data and control information to the base station through a UL. In this case, the data and control information may be for sidelink communication, or may be for cellular communication rather than sidelink communication. In addition, in FIG. 6A, the first sidelink terminal 620a and the second sidelink terminal 620b may transmit and receive data and control information for sidelink communication through a sidelink.

FIG. 6B illustrates partial coverage in which a first sidelink terminal 620a of the sidelink terminals is located within the coverage of the base station 610 and a second sidelink terminal 620b thereof is located outside the coverage of the base station 610. The first sidelink terminal 620a located within the coverage of the base station 610 may receive data and control information from the base station through a DL, or may transmit data and control information to the base station through an UL. The second sidelink terminal 620b located outside the coverage of the base station 610 is unable to receive data and control information from the base station through a DL, and is unable to transmit data and control information to the base station through an UL. The second sidelink terminal 620b may transmit and receive data and control information for sidelink communication to and from the first terminal 610a through a sidelink.

FIG. 6C shows an example in which sidelink terminals (e.g., a first sidelink terminal 610a and a second sidelink terminal 620b) are located outside the coverage of the base station 610. Therefore, the first sidelink terminal 620a and the second sidelink terminal 620b are unable to receive data and control information from the base station through a DL, and are unable to transmit data and control information to the base station through an UL. The first sidelink terminal 620a and the second sidelink terminal 620b may transmit and receive data and control information for sidelink communication through a sidelink.

FIG. 6D illustrates the case of performing inter-cell sidelink communication in which a first sidelink terminal 620a and a second sidelink terminal 620b, which perform sidelink communication, are in a connection state (e.g., an RRC connection state) with different base stations from each other (e.g., a first base station 610a and a second base station 610b) or are camping thereon (e.g., an RRC connection release state that is an RRC idle state). In this case, the first terminal 620a may be a sidelink transmission terminal, and the second terminal 620b may be a sidelink reception terminal. Alternatively, the first terminal 620a may be a sidelink reception terminal, and the second terminal 620b may be a sidelink transmission terminal. The first terminal 620a may receive a system information block (SIB) dedicated to a sidelink from the base station 610a to which the first terminal 620a has accessed (or on which the first terminal 620a is camping), and the second terminal 620b may receive an SIB dedicated to a sidelink from another base station 610b to which the second terminal 620b has accessed (or on which the second terminal 620b is camping). In this case, information on the SIB dedicated to a sidelink, which is received by the first terminal 620a, may be different from information on the SIB dedicated to a sidelink, which is received by the second terminal 620b. Accordingly, it is necessary to unify the information in order to perform sidelink communication between the terminals located in different cells.

Although examples of the sidelink system configured with two terminals (e.g., the first sidelink terminal 620a and the second sidelink terminal 620b) have been described in the examples in FIGS. 6A to 6D for convenience of description, the disclosure is not limited thereto, and may be applied to a sidelink system in which three or more terminals participate. In addition, the UL or the DL between the base station 610 and the sidelink terminals may be referred to as a "Uu interface", and the sidelink between the sidelink terminals may be referred to as a "PC-5 interface". In the following description, the UL, the DL, the Uu interface, the sidelink, and the PC-5 may be used interchangeably with each other.

Meanwhile, in the disclosure, the terminal may indicate a vehicle supporting V2V communication, a vehicle or a pedestrian handset (e.g., a smartphone) supporting V2P communication, a vehicle supporting V2N communication, or a vehicle supporting V2I communication. In addition, in the disclosure, the terminal may indicate an RSU equipped with terminal functions, an RSU equipped with base station functions, or an RSU equipped with some of base station functions and some of terminal functions.

Figure 7A:
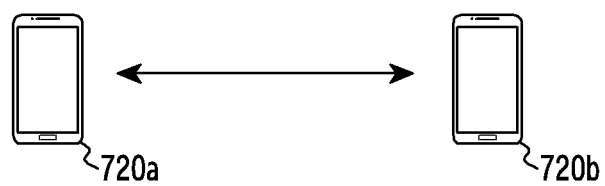
FIG. 7A illustrates an example of a transmission method of sidelink communication in a wireless communication system, according to an embodiment.
Figure 7B:
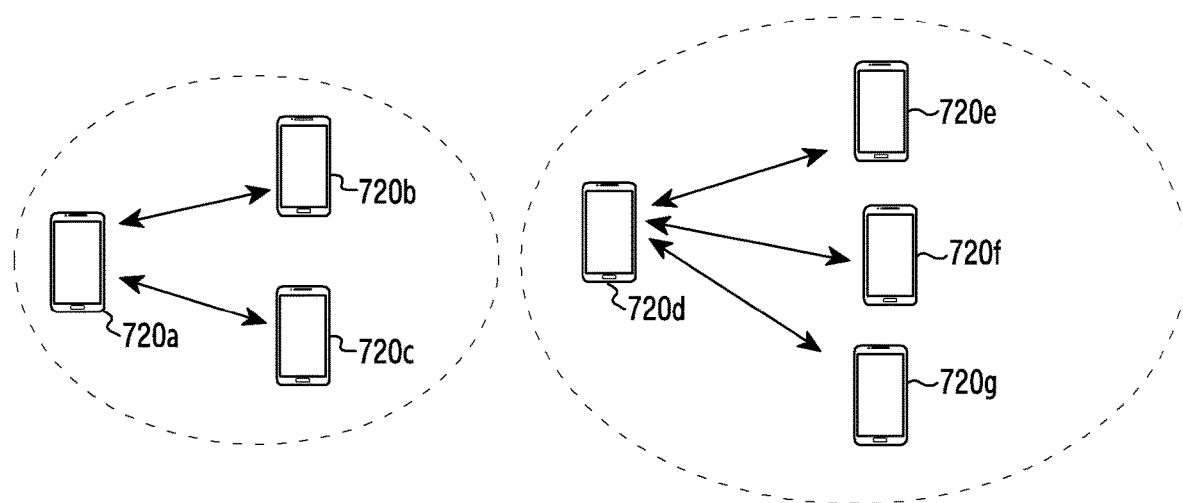
FIG. 7B illustrates an example of a transmission method of sidelink communication in a wireless communication system, according to an embodiment.

FIG. 7A illustrates an example of a transmission method of sidelink communication in a wireless communication system, according to an embodiment. FIG. 7B illustrates an example of a transmission method of sidelink communication in a wireless communication system, according to an embodiment. FIG. 7A illustrates a unicast method, and FIG. 7B illustrates a groupcast method.

As shown in FIG. 7A, a transmission terminal 720a and a reception terminal 720b may perform one-to-one communication. The transmission method shown in FIG. 7A may be referred to as "unicast communication". As shown in FIG. 7B, a first transmission terminal 720a or a second transmission terminal 720d and a first reception terminal 720b, a second reception terminal 720c, a third reception terminal 720e, a fourth reception terminal 720f, and a fifth reception terminal 720g may perform one-to-many communication. The transmission method shown in FIG. 7B may be referred to as "groupcast communication" or "multicast communication". In FIG. 7B, the first transmission terminal 720a, the first reception terminal 720b, and the second reception terminal 720c constitute one group and perform groupcast communication, and the second transmission terminal 720d, the third reception terminal 720e, the fourth reception terminal 720f, and the fifth reception terminal 720g constitute another group and perform groupcast communication. The terminals may perform groupcast communication within the group to which they belong, and may perform unicast, groupcast, or broadcast communication with at least one other terminal that belongs to a different group. Although two groups are illustrated in FIG. 7B, the disclosure is not limited thereto, and may be applied to the case in which a larger number of groups are configured.

The sidelink terminals may perform broadcast communication. The broadcast communication denotes a method in which all sidelink terminals receive data and control information transmitted by the sidelink transmission terminal through a sidelink. For example, if the first transmission terminal 720a is a transmission terminal in FIG. 7B, the remaining terminals may receive data and control information transmitted from the first terminal 720a.

The sidelink unicast communication, the groupcast communication, and the broadcast communication described above may be supported by an in-coverage scenario, a partial-coverage scenario, or an out-of-coverage scenario.

In the case of an NR sidelink, unlike in the LTE sidelink, the support for a transmission scheme in which a vehicle terminal transmits data to only one specific terminal through the unicast communication and a transmission scheme in which a vehicle terminal transmits data to a plurality of specific terminals through the groupcast communication may be considered. For example, the unicast and groupcast technologies may be usefully applied to the case of a service scenario such as platooning in which two or more vehicles are connected to a single network and move together in a cluster. Specifically, the unicast communication may be used for a leader terminal in a group connected by platooning to control one specific terminal, and the groupcast communication may be used for the leader terminal to simultaneously control the group including a plurality of specific terminals.

The following two methods may be used for resource allocation in a V2X system:

1. Resource Allocation Mode 1—Scheduled Resource Allocation

Scheduled resource allocation is a method in which a base station allocates resources used for sidelink transmission to RRC-connected terminals in a dedicated scheduling method. The scheduled resource allocation method may be effective for interference management and resource pool management (dynamic allocation and/or semi-persistent transmission) because the base station is able to manage the resources of the sidelink. If a terminal in an RRC connection mode has data to be transmitted to the other terminals, the terminal may transmit, to a base station, information indicating that there is data to be transmitted to other terminals using an RRC message or a MAC CE. For example, the RRC message that the terminal transmits to the base station may be a sidelink terminal information message (sidelinkUEInformation) or a terminal assistance information message (UEAssistanceInformation), and the MAC CE may correspond to a buffer status report (BSR) MAC CE, a scheduling request (SR), including at least one of an indicator indicating a BSR for V2X communication or information on the size of data buffered for sidelink communication.

2. Resource Allocation Mode 2—UE Autonomous Resource Allocation

Secondly, UE autonomous resource selection is a method in which a sidelink transmission/reception resource pool for V2X is provided to a terminal using system information or an RRC message (for example, an RRCReconfiguration message or a PC5-RRC message}, in which the terminal selects a resource pool and resources according to a predetermined rule. The UE autonomous resource selection may correspond to one or more of the following resource allocation methods ((a)-(d)):

(a) The terminal autonomously selects sidelink resources for transmission.

(b) The terminal assists sidelink resource selection for other terminals.

(c) The terminal is configured with an NR-configured grant for sidelink transmission.

(d) The terminal may schedule sidelink transmission of other terminals.

The resource selection method of the terminal may include zone mapping, sensing-based resource selection, and random selection. In addition, even if a terminal is located in the coverage of the base station, resource allocation or resource selection may not be performed according to the scheduled resource allocation or the UE autonomous resource selection mode, and in this case, the terminal may perform V2X sidelink communication through a preconfigured sidelink transmission/reception resource pool. Additionally, if the terminals for V2X communication are located outside the coverage of the base station, the terminals may perform V2X sidelink communication through a preconfigured sidelink transmission/reception resource pool.

Sidelink radio bearer (SLRB) configuration and SLRBs for transmitting sidelink flow or packets may be mapped to a sidelink logical channel group (LCG), and the sidelink LCG may be mapped to a sidelink logical channel. The SLRB configuration and the SLRBs may be distinguished according to combinations of a source index, a destination index, a cast type, a quality of service (QoS) flow identifier (QFI)/ProSe flow identifier or a PC5 flow identifier (PFI), and a priority.

Figure 8A:
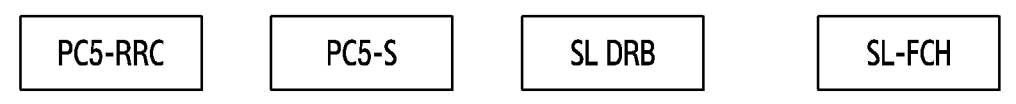
Figure 8B:
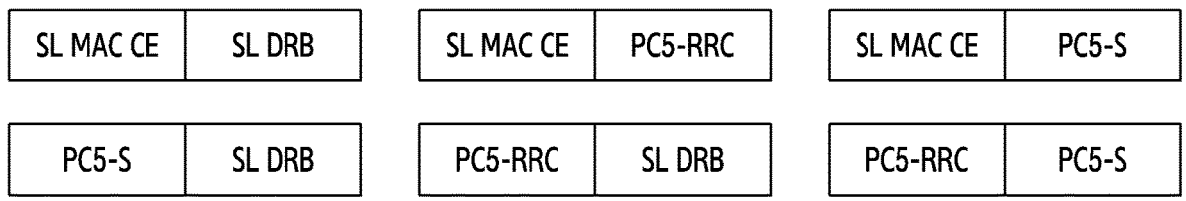
FIG. 8B illustrates combinations of data transmitted through an UL or a sidelink in a wireless communication system, according to an embodiment.
Figure 8D:
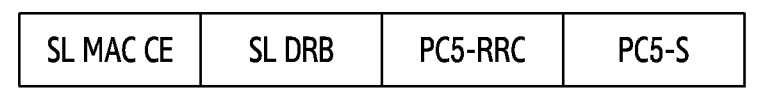
Figure 8F:
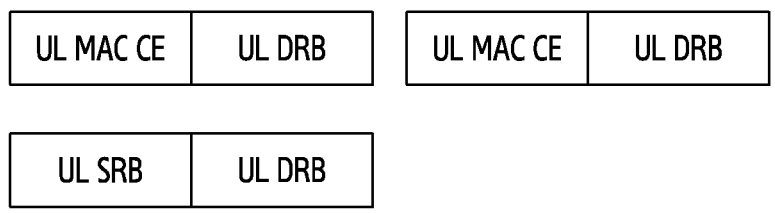
FIG. 8F illustrates combinations of data transmitted through an UL or a sidelink in a wireless communication system, according to an embodiment.

FIG. 8A illustrates combinations of data transmitted through a UL or a sidelink in a wireless communication system, according to an embodiment. FIG. 8B illustrates combinations of data transmitted through a UL or a sidelink in a wireless communication system, according to an embodiment, FIG. 8C illustrates combinations of data transmitted through a UL or a sidelink in a wireless communication system, according to an embodiment. FIG. 8D illustrates combinations of data transmitted through a UL or a sidelink in a wireless communication system, according to an embodiment. FIG. 8E illustrates combinations of data transmitted through a UL or a sidelink in a wireless communication system, according to an embodiment. FIG. 8F illustrates combinations of data transmitted through a UL or a sidelink in a wireless communication system, according to an embodiment. FIG. 8G illustrates combinations of data transmitted through a UL or a sidelink in a wireless communication system, according to an embodiment.

Referring to FIGS. 8A to 8G, the terminal may transmit at least one of a signalling radio bearer (SRB) (e.g., an RRC), a dedicated radio bearer (DRB), a MAC CE, a PUCCH, a PC5-RRC, a PC5-S, a sidelink-DRB, a sidelink feedback channel (SL-FCH), and a sidelink media access control (SL MAC) CE through the UL or the sidelink. The data that the terminal is able to transmit through the sidelink may be at least one of a PC5-RRC, a PC5-S, a sidelink-DRB, an SL-FCH, and an SL MAC CE, or a combination thereof as shown in FIGS. 8A to 8D. Here, the combination is possible in the case where one or more pieces of sidelink data can be multiplexed on the SL MAC protocol data unit (PDU), and the SL-FCH is not combined with other data. The data that the terminal is able to transmit through the UL may be at least one of an SRB (i.e., an RRC), a DRB, a MAC CE, and a PUCCH, or a combination thereof, as shown in FIGS. 8E to 8G. Here, the combination is possible in the case where one or more pieces of UL data can be multiplexed on the UL MAC PDU, and the PUCCH is not combined with other data.

UL resources and sidelink resources may be allocated to different frequencies from each other in the same time resource. For example, the UL resource and the sidelink resource positioned on the same time axis may be allocated to different bandwidth parts (BWPs). In this case, it may be difficult for the terminal to use both the UL resource and the sidelink resource due to limitations of hardware capability, and limitations of the maximum transmission power. For example, the limitations of hardware capability may include the number of beams that can be formed simultaneously, the size of a supportable bandwidth, the number of antennas, and sharing/separating power devices. Accordingly, the disclosure relates to a method and an apparatus for determining transmission priority between the UL and the sidelink if it is determined that the terminal is unable to simultaneously transmit both a UL transmission packet and a sidelink transmission packet. In addition, the disclosure relates to a method and an apparatus for determining priority for packet transmission between the UL and the sidelink in a vehicle-to-everything (V2X) system of a next-generation wireless communication system.

Hereinafter, embodiments for determining transmission priority between UL data and sidelink data shown in FIGS. 8A to 8G will be described.

The terminal may be configured to determine transmission priority between UL data including an MAC CE and sidelink data. In this case, since the terminal is required to determine the priority value of the MAC CE, the system may define criteria for configuring the priority value of the MAC CE. For example, the criteria for configuring the priority value of the MAC CE may be correlation with RRC, which is required to be urgently and preferentially processed in order for a corresponding MAC CE to transmit normal UL data (e.g., corresponding to user packets) and normal sidelink data (e.g., corresponding to user packets). That is, the MAC CE determined to be related to the RRC, which is required to be preferentially processed in order to transmit normal UL data and normal sidelink data, may be configured to have a higher priority value than the normal UL data and the normal sidelink data. The MAC CE determined to have little relevance to the RRC, which is required to be preferentially processed in order to transmit normal UL data and normal sidelink data, may be configured to have a lower priority value than the normal UL data and the normal sidelink data. As described above, the method of configuring the priority value for the MAC CE and comparing the priority values between the MAC CE and the normal UL data or the normal sidelink data has the advantage of supporting the priority transmission at a more accurate level because the method is able to consider all data that can be transmitted by the terminal.

The terminal may determine transmission priority between UL data and sidelink data, excluding the MAC CE. In this case, since the system does not need to define criteria for configuring the priority value for the MAC CE, the method of determining the priority value, excluding the MAC CE, is not complicated.

Figure 9A:
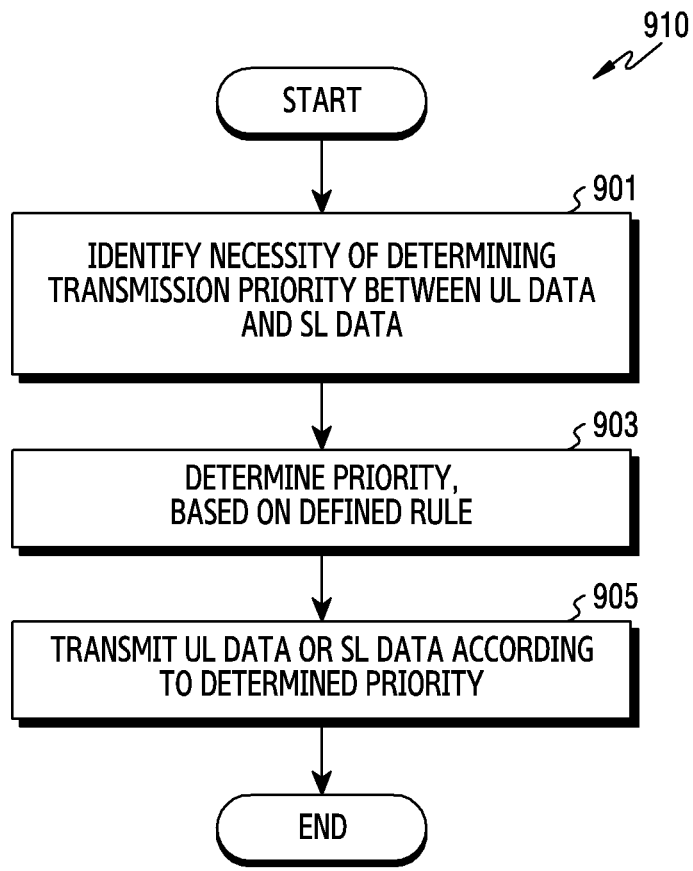
FIG. 9A illustrates a flowchart of a terminal transmitting data according to priority in a wireless communication system, according to an embodiment.

FIG. 9A illustrates a flowchart 910 in which a terminal transmits data depending on priority in a wireless communication system, according to an embodiment. FIG. 9A illustrates an operation method of the terminal 120.

Referring to FIG. 9A, in step 901, the terminal identifies the necessity of determining transmission priority between UL data and sidelink data. For example, after receiving information on the allocation of UL resources and sidelink resources and identifying the UL resources and the sidelink resources, based on the information, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 903, the terminal determines priority, based on a defined rule. The defined rule may vary depending on specific embodiments. An embodiment of the rule will be described later with reference to FIGS. 10A to 10D.

In step 905, the terminal transmits the UL data or the sidelink data according to the determined priority. In other words, the terminal may encode and modulate data determined to have high priority, thereby transmitting the same. At this time, data determined to have low priority may be dropped, or may be transmitted at low power. Here, "transmission at low power" means that the data determined to have low priority is transmitted at lower power than the power applied in the case where the data is determined to have high power. For example, the low power may be less than or equal to the remaining power, excluding the power used to transmit the data determined to have high priority from the maximum transmission power of the terminal.

Figure 9B:
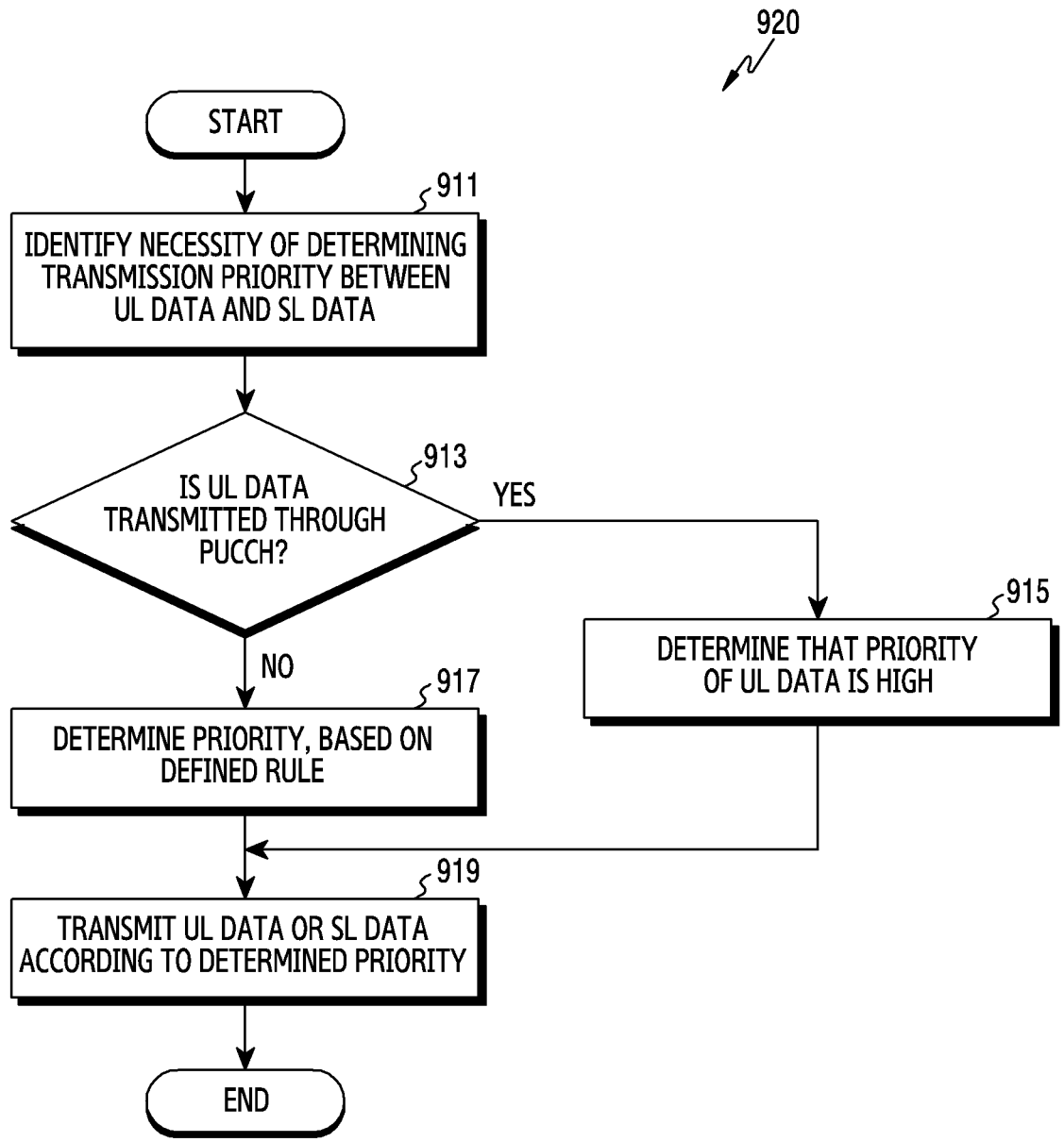
FIG. 9B illustrates a flowchart of a terminal transmitting data according to priority in a wireless communication system, according to an embodiment.

FIG. 9B illustrates another flowchart 920 in which a terminal determines priority between UL data and sidelink data, according to an embodiment. FIG. 9B illustrates an operation method of the terminal 120.

Referring to FIG. 9B, in step 911, the terminal identifies the necessity of determining transmission priority between UL data and sidelink data. For example, after receiving information on the allocation of UL resources and sidelink resources and identifying the UL resources and the sidelink resources, based on information, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 913, the terminal determines whether or not the UL data is required to be transmitted through a PUCCH. In other words, the terminal may identify whether or not the data to be transmitted through the PUCCH is pending. If the UL data needs to be transmitted through a PUCCH, the terminal may determine that the transmission priority of the UL data is higher in step 915. On the other hand, if the UL data does not need to be transmitted through the PUCCH, the terminal determines priority, based on a defined rule, in step 917. The defined rule may vary depending on specific embodiments. An embodiment of the rule will be described below with reference to FIGS. 10A to 10D.

In step 919, the terminal transmits the UL data or the sidelink data according to the determined priority. In other words, the terminal may encode and modulate the data determined to have the highest priority, thereby transmitting the same. At this time, the data determined to have low priority may be dropped, or may be transmitted at low power. Here, "transmission at low power" means that the data determined to have low priority is transmitted at lower power than the power applied in the case where the data is determined to have high power. For example, the low power may be less than or equal to the remaining power, excluding the power used to transmit data determined to have high priority from the maximum transmission power of the terminal.

The operation illustrated in FIG. 9B is an embodiment in which transmission priority of the PUCCH among the UL data is defined to be higher than that of the sidelink data. According to another embodiment, in the case where the transmission priority of the PUCCH is not always defined to be higher than that of the sidelink data, if the UL data includes the PUCCH, the terminal may determine the priority between the PUCCH and the sidelink data according to the procedures described in FIGS. 9A and 10A-10D. In this case, the PUCCH, instead of the MAC CE, may be the object to be determined.

In the case where the transmission priority of an SRB among the UL data is defined to be higher than that of the sidelink data, if the UL data includes an SRB, the terminal may determine the priority between the SRB and the sidelink data according to the procedure described in FIG. 9B. In this case, in FIG. 9B, the SRB, instead of the PUCCH, may be the object to be determined.

In the case where the transmission priority of an SRB is not always defined to be higher than that of the sidelink data, if the UL data includes an SRB, the terminal may determine priority between the SRB and the sidelink data according to the operations described in FIGS. 9A and 10A-10D. In this case, the SRB, instead of the MAC CE, may be the object to be determined.

Hereinafter, detailed operations of determining priority will be described with reference to FIGS. 10A to 10E.

Figure 10A:
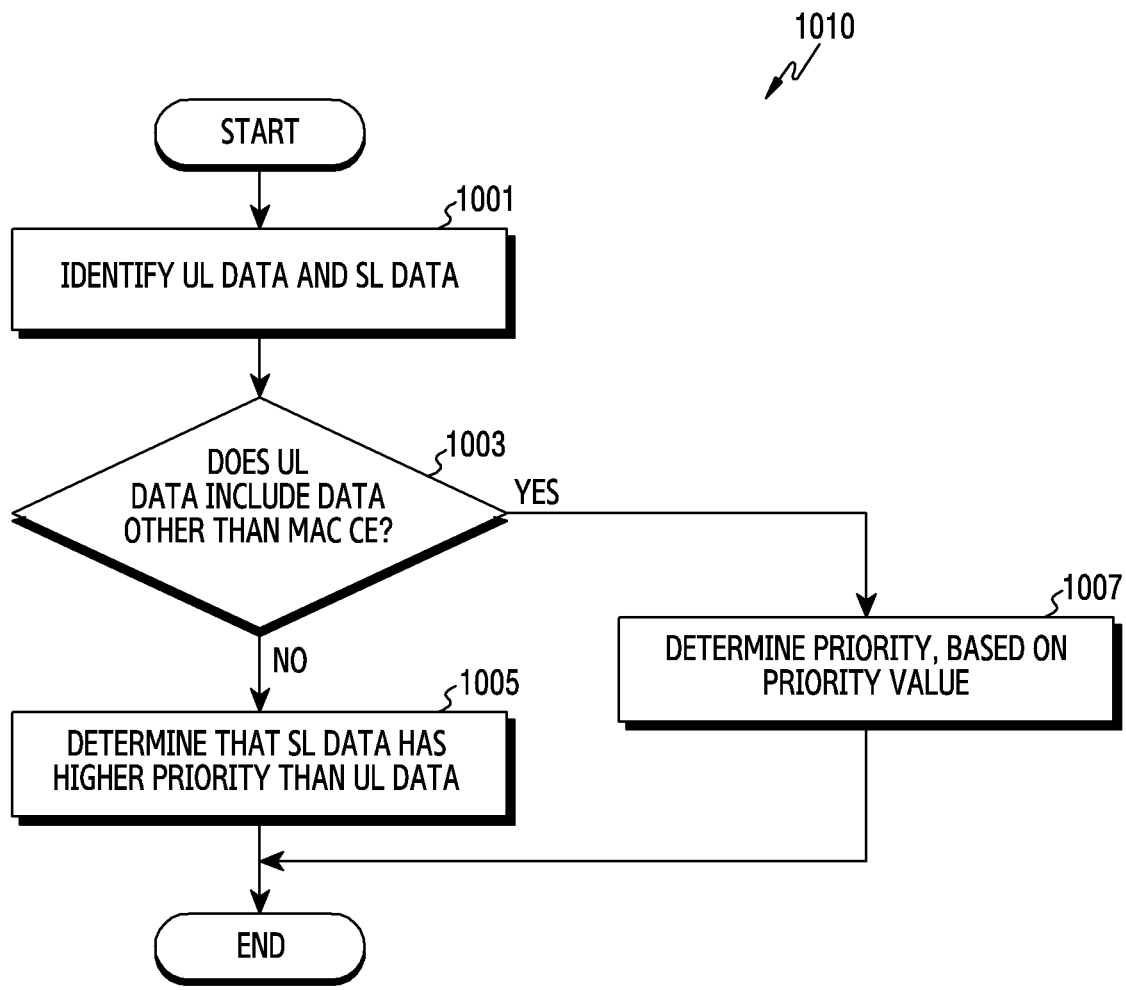
FIG. 10A illustrates a flowchart in which a terminal determines priority between UL data and sidelink data in a wireless communication system, according to an embodiment.

FIG. 10A illustrates a flowchart 1010 in which a terminal determines priority between UL data and sidelink data in a wireless communication system, according to an embodiment. FIG. 10A illustrates an operation method of the terminal 120.

Referring to FIG. 10A, in step 1001, the terminal identifies UL data and sidelink data. The data may include a MAC PDU. That is, the terminal may identify a combination of data included in the UL data and the sidelink data. In step 1003, the terminal identifies whether or not the UL data includes data other than the MAC CE. If the UL data does not include data other than the MAC CE, the terminal may determine that the sidelink data has higher priority than the UL data in step 1005.

On the other hand, if the UL data includes data other than the MAC CE, the terminal determines priority, based on priority values, in step 1007. In other words, the terminal may determine transmission priority between the remaining UL data, excluding the MAC CE, and the sidelink data. To this end, the terminal may compare the priority value of UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 10B:
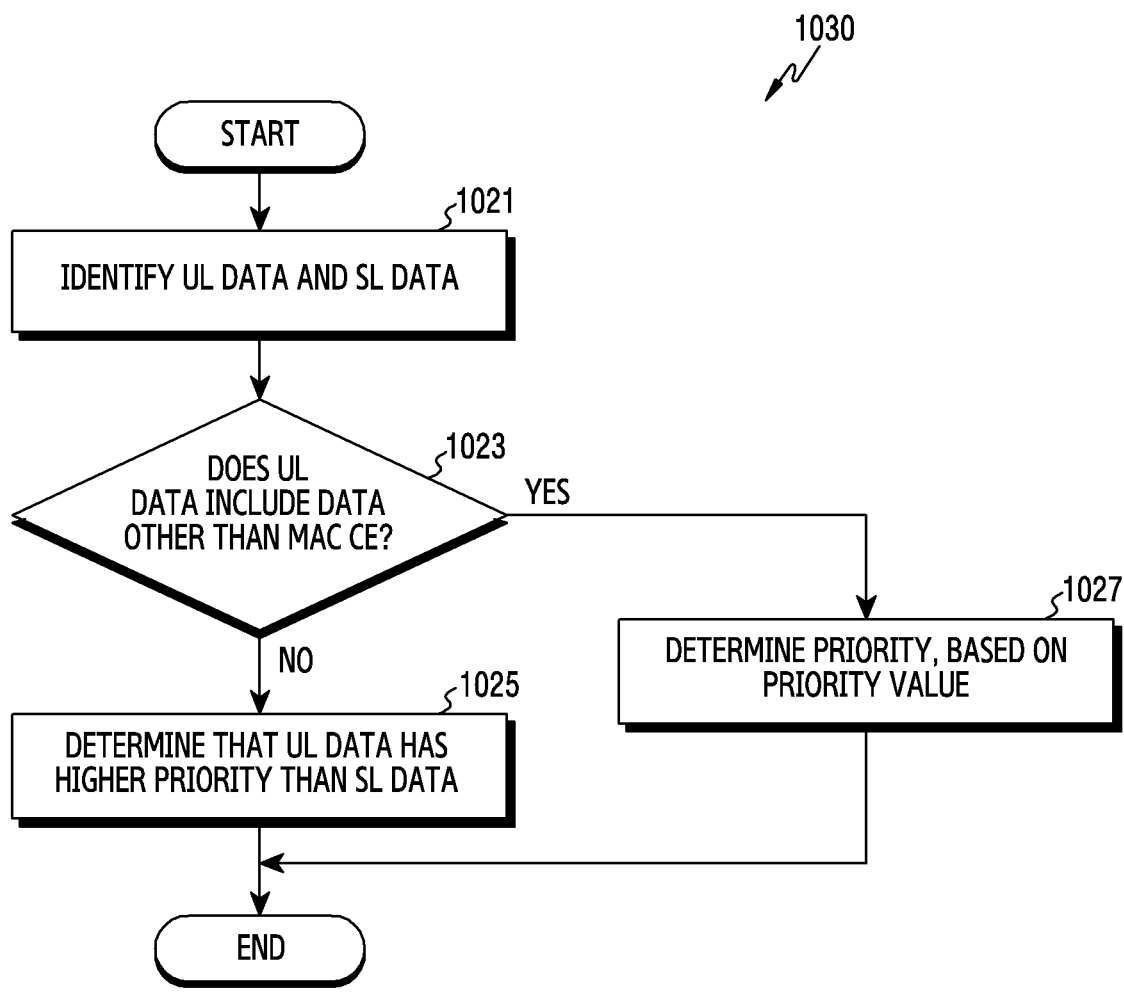
FIG. 10B illustrates a flowchart in which a terminal determines priority between UL data and sidelink data in a wireless communication system, according to an embodiment.

FIG. 10B illustrates a flowchart 1030 in which a terminal determines priority between UL data and sidelink data in a wireless communication system, according to an embodiment. FIG. 10B illustrates an operation method of the terminal 120.

Referring to FIG. 10B, in step 1021, the terminal identifies UL data and sidelink data. The data may include a MAC PDU. That is, the terminal may identify a combination of data included in the UL data and the sidelink data. In step 1023, the terminal identifies whether or not the UL data includes data other than the MAC CE. If the UL data does not include data other than the MAC CE, the terminal determines that the UL data has higher priority than the sidelink data in step 1025. That is, the terminal may determine that the MAC CE transmitted in the UL has higher priority than the sidelink data.

On the other hand, if the UL data includes data other than the MAC CE, the terminal determines priority, based on priority values, in step 1027. In other words, the terminal may determine transmission priority between the remaining UL data, excluding the MAC CE, and the sidelink data. To this end, the terminal may compare the priority value of UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 10C:
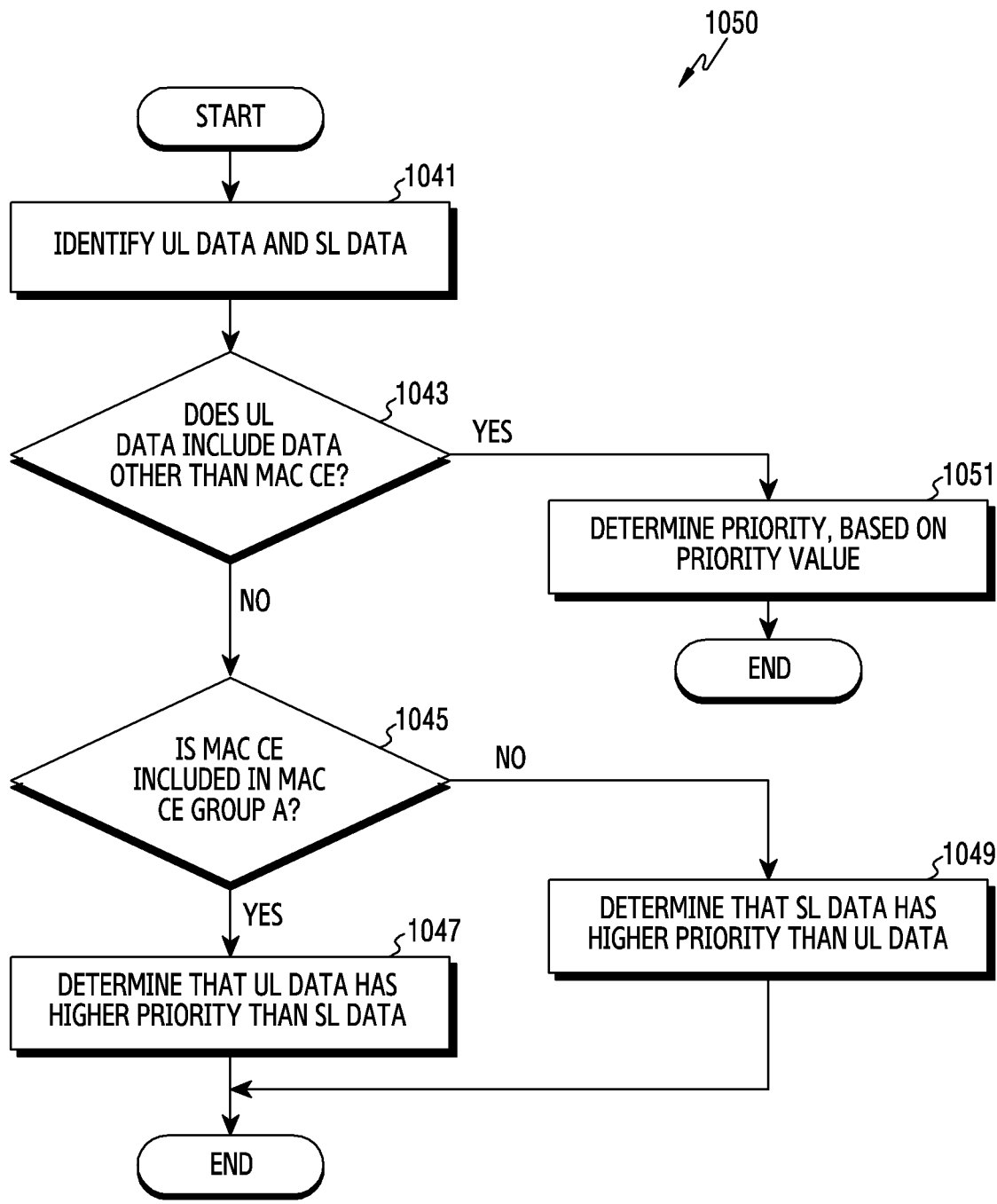
FIG. 10C illustrates a flowchart in which a terminal determines priority between UL data and sidelink data in a wireless communication system, according to an embodiment.

FIG. 10C illustrates a flowchart 1050 in which a terminal determines priority between UL data and sidelink data in a wireless communication system, according to an embodiment. FIG. 10C illustrates an operation method of the terminal 120.

Referring to FIG. 10C, in step 1041, the terminal identifies UL data and sidelink data. The data may include a MAC PDU. That is, the terminal may identify a combination of data included in the UL data and the sidelink data. In step 1043, the terminal identifies whether or not the UL data includes data other than the MAC CE.

If the UL data does not include data other than the MAC CE, the terminal identifies a MAC CE group including at least one MAC CE in step 1045. A plurality of MAC CE groups may be defined, and the MAC CE groups may be divided into a group having higher transmission priority than the sidelink data and a group having lower transmission priority than the sidelink data. For example, MAC CE group "A" may include MAC CEs having higher transmission priority than the sidelink data. Accordingly, the MAC CE that does not belong to MAC CE group "A" may be determined to have lower transmission priority than the sidelink data. Information on the MAC CEs belonging to MAC CE group "A" may be configured in the terminal by the system, or may be pre-stored in the terminal. Even if the terminal pre-stores information about MAC CE group "A" therein, if the system configures new information about MAC CE group "A", the terminal may use the information configured by the system.

If at least one MAC CE is included in MAC CE group "A", the terminal may determine that the UL data has higher transmission priority than the sidelink data in step 1047. On the other hand, if no MAC CE is included in MAC CE group "A", the terminal determines that the sidelink data has higher transmission priority than the UL data in step 1049.

If the UL data includes data other than the MAC CE, the terminal determines priority, based on priority values, in step 1051. In other words, the terminal may determine transmission priority between the remaining UL data, excluding the MAC CE, and the sidelink data. To this end, the terminal may compare the priority value of UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 10D:
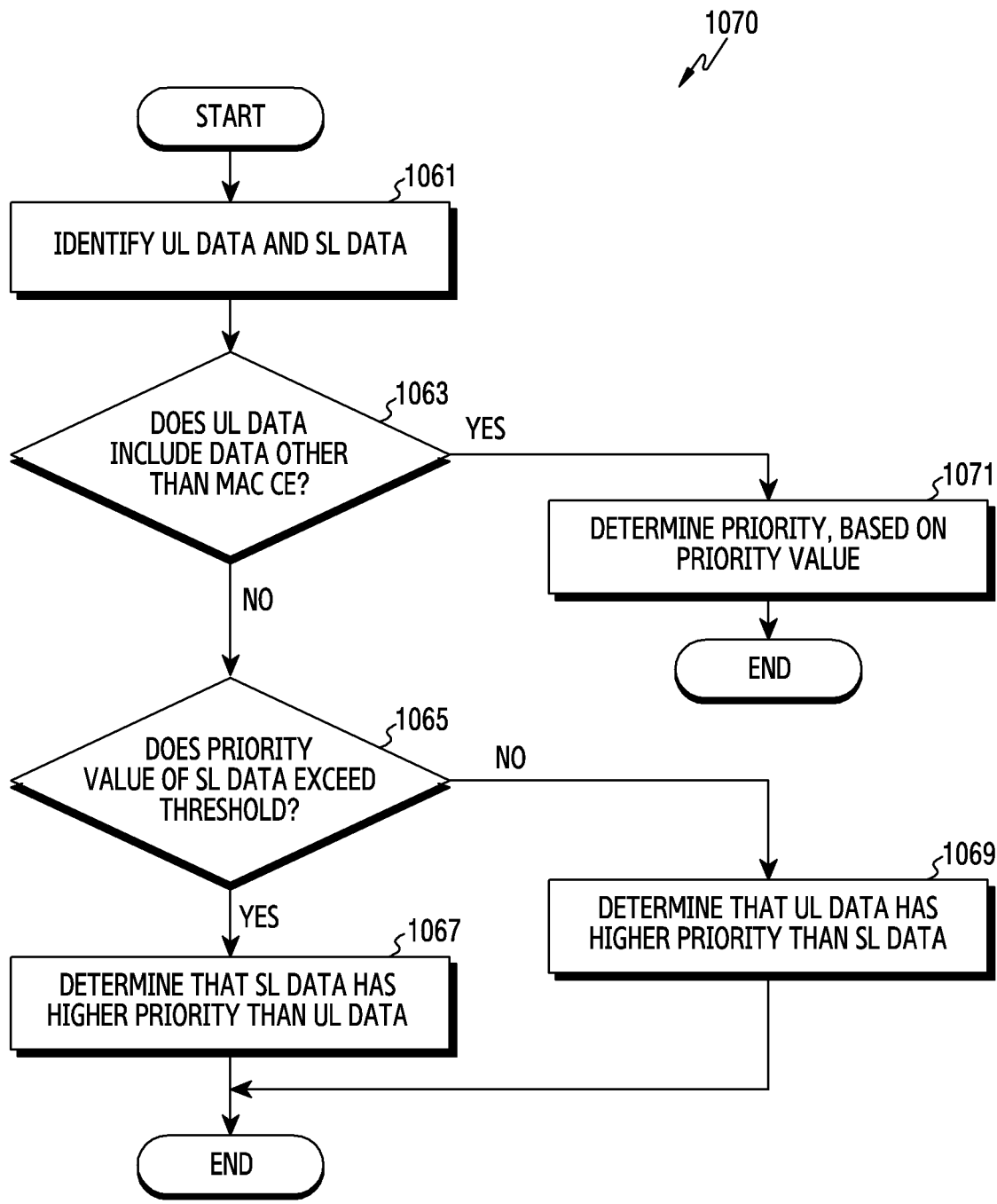
FIG. 10D illustrates a flowchart in which a terminal determines priority between UL data and sidelink data in a wireless communication system, according to an embodiment.

FIG. 10D illustrates a flowchart 1070 in which a terminal determines priority between UL data and sidelink data in a wireless communication system, according to an embodiment. FIG. 10D illustrates an operation method of the terminal 120.

Referring to FIG. 10D, in step 1061, the terminal identifies UL data and sidelink data. The data may include a MAC PDU. That is, the terminal may identify a combination of data included in the UL data and the sidelink data. In step 1063, the terminal identifies whether or not the UL data includes data other than the MAC CE.

If the UL data does not include data other than the MAC CE, the terminal compares the priority value of the sidelink data with a threshold in step 1065. In other words, the terminal may determine whether or not the priority value of the sidelink data is greater than a predetermined threshold. For example, in the case where a plurality of pieces of sidelink data is combined, the terminal may compare the priority value of the sidelink data having the highest priority, among the plurality of pieces of sidelink data, with a threshold. In the embodiment, the priority value greater than a threshold indicates that the transmission priority is high. However, according to another embodiment, the priority value less than a threshold may indicate that the transmission priority is high. In this case, step 1065 may be replaced with an operation of determining whether or not the priority value of the sidelink data is less than a predetermined threshold.

If the priority value of the sidelink data is greater than a threshold, the terminal determines that the sidelink data has higher transmission priority than the UL data in step 1067. On the other hand, if the priority value of the sidelink data is not greater than a threshold, the terminal determines that the UL data has higher transmission priority than the sidelink data in step 1069.

If the UL data includes data other than the MAC CE, the terminal determines priority, based on priority values, in step 1071. In other words, the terminal may determine transmission priority between the remaining UL data, excluding the MAC CE, and the sidelink data. To this end, the terminal may compare the priority value of UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 10E:
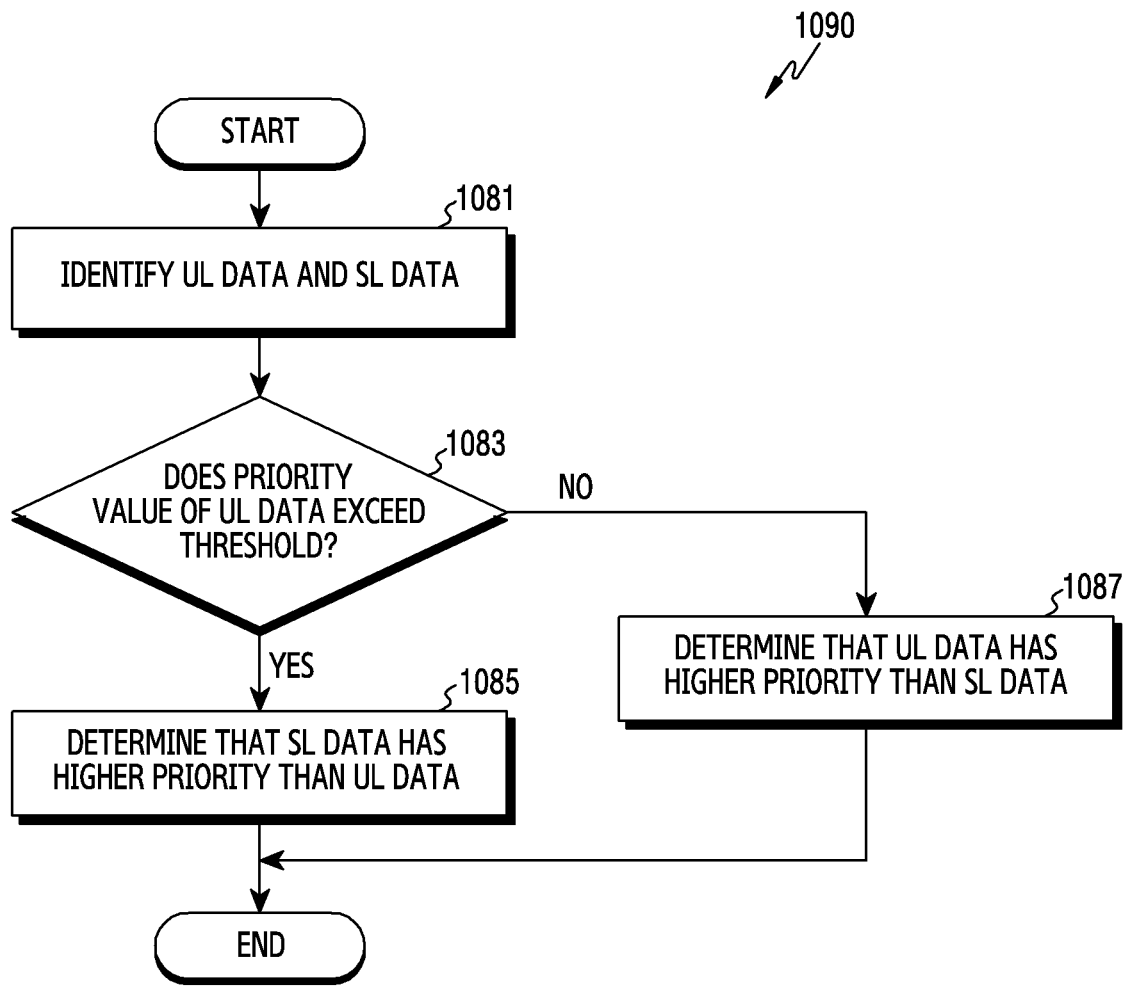
FIG. 10E illustrates a flowchart in which a terminal determines priority between UL data and sidelink data in a wireless communication system, according to an embodiment.

FIG. 10E illustrates a flowchart 1090 in which a terminal determines priority between UL data and sidelink data in a wireless communication system, according to an embodiment. FIG. 10E illustrates an operation method of the terminal 120.

Referring to FIG. 10E, in step 1081, the terminal identifies UL data and sidelink data. The data may include a MAC PDU. That is, the terminal may identify a combination of data included in the UL data and the sidelink data.

In step 1083, the terminal compares the priority value of the sidelink data with a threshold. In other words, the terminal may determine whether or not the priority value of the sidelink data is greater than a predetermined threshold. For example, in the case where a plurality of pieces of sidelink data is combined, the terminal may compare the priority value of the sidelink data having the highest priority, among the plurality of pieces of sidelink data, with a threshold. In the embodiment, the priority value greater than a threshold indicates that the transmission priority is high. However, according to another embodiment, the priority value less than a threshold may indicate that the transmission priority is high. In this case, step 1083 may be replaced with an operation of determining whether or not the priority value of the sidelink data is less than a predetermined threshold.

If the priority value of the sidelink data is greater than a threshold, the terminal determines that the sidelink data has higher transmission priority than the UL data in step 1085. On the other hand, if the priority value of the sidelink data is not greater than a threshold, the terminal determines that the UL data has higher transmission priority than the sidelink data in step 1087.

Hereinafter, embodiments of operating the priority values used in comparing the priority between the UL data and the sidelink data in the above-described embodiments will be described.

16-level priority values configured in a UL logical channel by the base station may be utilized as the priority values configured in the UL data. Like the UL, the base station may define 16-level priority values configured in the sidelink data, and may apply the same to a sidelink logical channel. That is, the system may use the same priority value so as to compare the priority of the sidelink logical channel, based on the priority values configured in the UL logical channel.

Since 8-level priority values are configured in an existing LTE-based sidelink logical channel, 8-level priority values may be applied to the sidelink logical channel in order to determine priority between the LTE-based sidelink and the NR-based sidelink. The base station may configure 8-level priority values for the UL logical channel in the same manner as the priority values configured in the sidelink data. The 8-level priority values may be configured separately from the existing 16-level priority values.

The base station may configure 16-level priority values for the UL logical channel, and may configure 8-level priority values for the sidelink logical channel. In order to compare priority between the UL and the sidelink, which have different level structures, the terminal may obtain information on the rule in which the 16-level priority values correspond to the 8-level priority values or the 8-level priority values correspond to the 16-level priority values. The corresponding rule between the priority values may be defined such that one priority value may correspond to two priority values. Assuming that 16-level priority values of the UL are 1 to 16 and 8-level priority values of the sidelink are 1 to 8, the UL priority values 1 and 2 may correspond to the sidelink priority value 1, and the UL priority values 3 and 4 may correspond to the sidelink priority value 2. In this case, if the UL priority value is 1, and if the sidelink priority value is 2, the terminal may determine that the priority of the UL is higher.

Additionally, the corresponding rule between the priority values may be defined such that the base station may configure the priority values of the logical channel, based on required QoS profiles. That is, the priority values may correspond to each other between the links according to levels of the QoS profiles (e.g., urgency, low latency, high reliability, and high speed) required for the sidelink logical channel and the UL logical channel, respectively. For example, it may be determined that the levels of the QoS profiles are similar between the UL priority values 1, 2, and 3 and the sidelink priority value 1, and that the levels of the QoS profiles are similar between the UL priority values 4, 5, 6, and 7 and the sidelink priority values 2 and 3. Accordingly, the terminal may determine that the sidelink priority value 1 corresponds to the UL priority values 1, 2, and 3, and that the sidelink priority values 2 and 3 correspond to the UL priority values 4, 5, 6, and 7. In this case, if the priority value of the UL is 4, and if the sidelink priority value is 1, the terminal may determine that the priority of the sidelink is higher.

The operation of the priority values may also be applied to the case of configuring the priority values for the MAC CE.

Figure 11A:
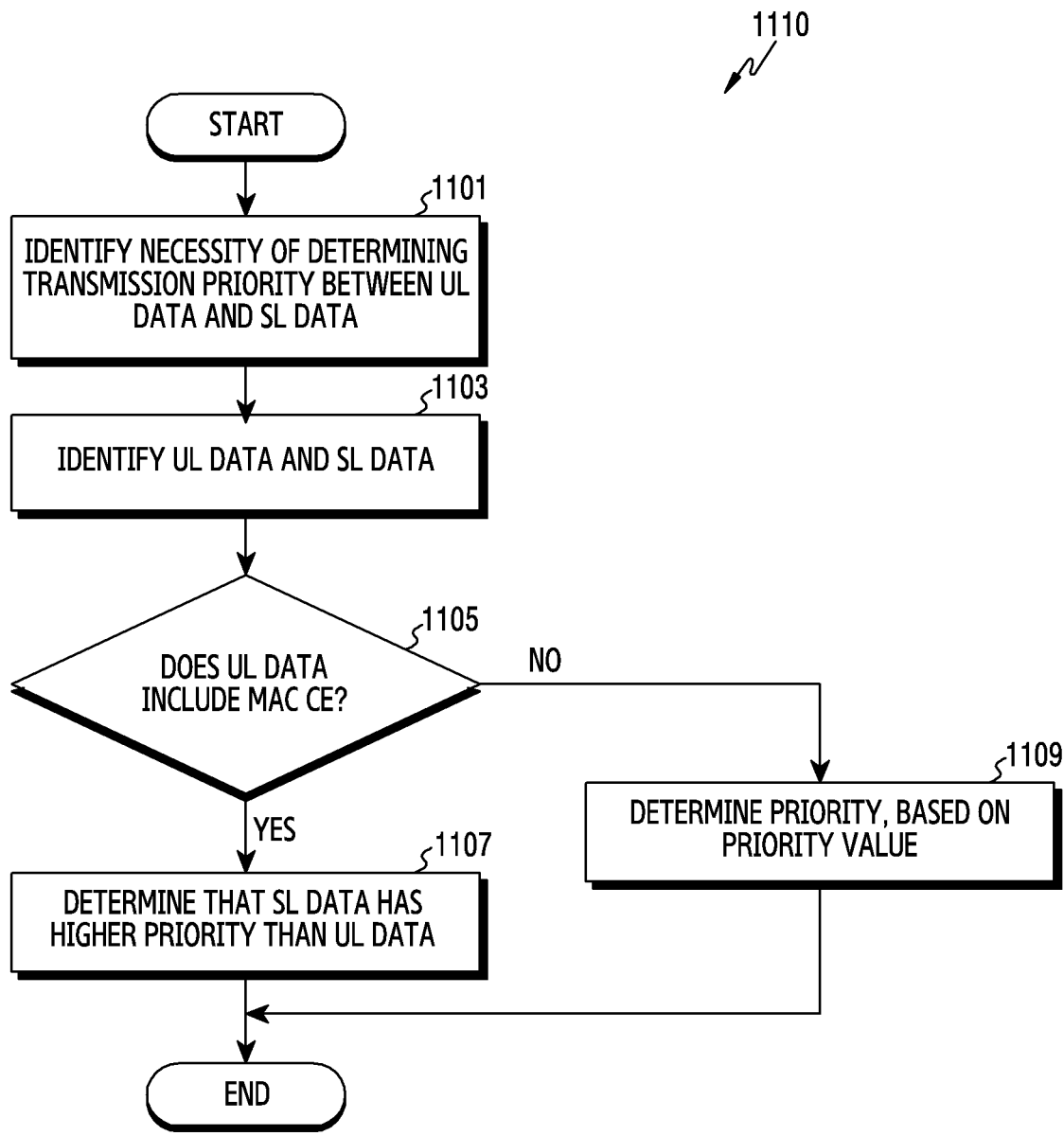
FIG. 11A illustrates a flowchart in which a terminal determines priority between UL data and sidelink data in a wireless communication system, according to an embodiment.

FIG. 11A illustrates a flowchart 1110 of a terminal for determining priority between UL data and sidelink data in a wireless communication system, according to an embodiment. FIG. 11A illustrates an operation method of the terminal 120.

Referring to FIG. 11A, in step 1101, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1103, the terminal identifies UL data and sidelink data. The data may include a MAC PDU. That is, the terminal may identify a combination of data included in the UL data and the sidelink data. In other words, the terminal may determine UL data and sidelink data that are the objects to be determined for transmission priority.

In step 1105, the terminal determines whether or not the UL data includes an MAC CE. If the UL data includes the MAC CE, the terminal determines that the sidelink data has higher transmission priority than the UL data in step 1107.

On the other hand, if the UL data does not include the MAC CE, the terminal determines priority, based on priority values, in step 1109. The terminal may compare the priority value of the UL data and the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 11B:
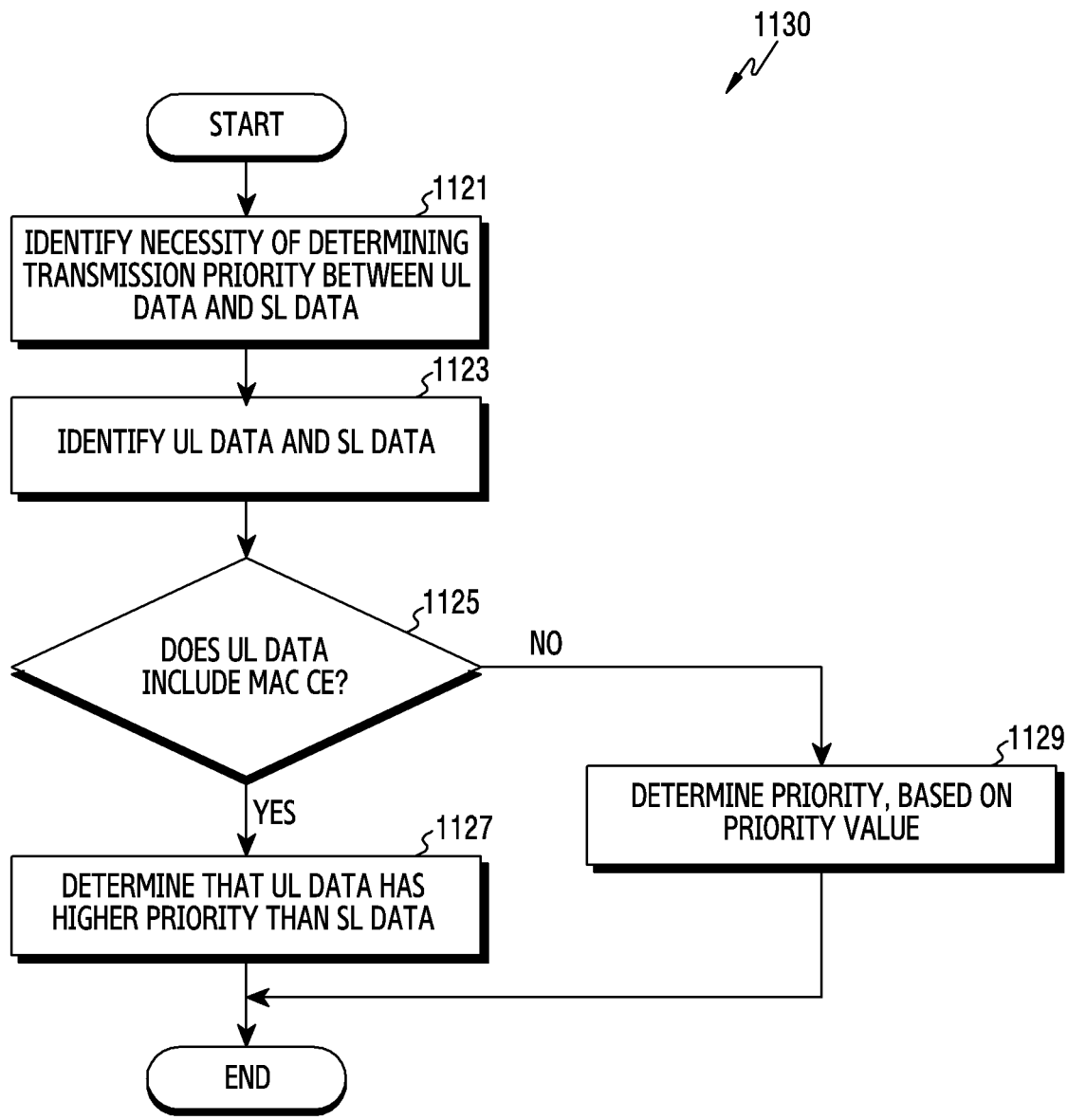
FIG. 11B illustrates a flowchart in which a terminal determines priority between UL data and sidelink data in a wireless communication system, according to an embodiment.

FIG. 11B illustrates a flowchart 1130 in which a terminal determines priority between UL data and sidelink data in a wireless communication system, according to an embodiment. FIG. 11B illustrates an operation method of the terminal 120.

Referring to FIG. 11B, in step 1121, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1123, the terminal identifies UL data and sidelink data. The data may include a MAC PDU. That is, the terminal may identify a combination of data included in the UL data and the sidelink data. In other words, the terminal may determine UL data and sidelink data that are the objects to be determined for transmission priority.

In step 1125, the terminal determines whether or not the UL data includes an MAC CE. If the UL data includes the MAC CE, the terminal determines that the UL data has higher priority than the sidelink data in step 1127.

On the other hand, if the UL data does not include the MAC CE, the terminal determines priority, based on priority values, in step 1129. The terminal may compare the priority value of the UL data and the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 11C:
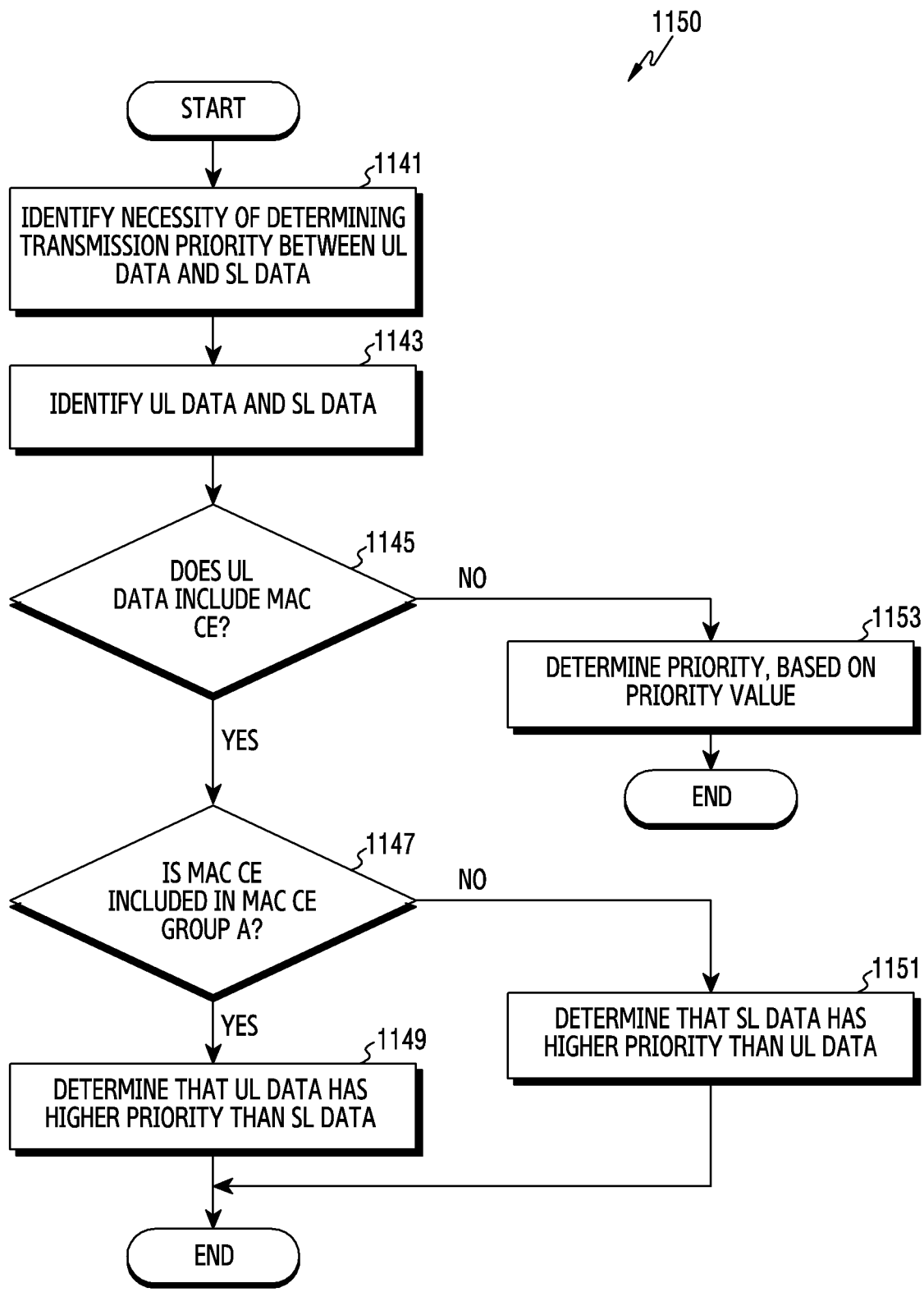
FIG. 11C illustrates a flowchart in which a terminal determines priority between UL data and sidelink data in a wireless communication system, according to an embodiment.

FIG. 11C illustrates a flowchart 1150 in which a terminal determines priority between UL data and sidelink data in a wireless communication system, according to an embodiment. FIG. 11C illustrates an operation method of the terminal 120.

Referring to FIG. 11C, in step 1141, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1143, the terminal identifies UL data and sidelink data. The data may include a MAC PDU. That is, the terminal may identify a combination of data included in the UL data and the sidelink data. In other words, the terminal may determine UL data and sidelink data that are the objects to be determined for transmission priority. In step 1145, the terminal determines whether or not the UL data includes an MAC CE.

If the UL data includes the MAC CE, the terminal identifies a MAC CE group including at least one MAC CE in step 1147. A plurality of MAC CE groups may be defined, and the MAC CE groups may be divided into a group having higher transmission priority than the sidelink data and a group having lower transmission priority than the sidelink data. For example, MAC CE group "A" may include MAC CEs having higher transmission priority than the sidelink data. Accordingly, the MAC CE that does not belong to MAC CE group "A" may be determined to have lower transmission priority than the sidelink data. Information on the MAC CEs belonging to MAC CE group "A" may be configured in the terminal by the system, or may be pre-stored in the terminal. Even if the terminal pre-stores information about MAC CE group "A" therein, if the system configures new information about MAC CE group "A", the terminal may use the information configured by the system.

If at least one MAC CE is included in MAC CE group "A", the terminal determines that the UL data has higher transmission priority than the sidelink data in step 1149. On the other hand, if no MAC CE is included in MAC CE group "A", the terminal determines that sidelink data has higher transmission priority than the UL data in step 1151.

If the UL data includes data other than the MAC CE, the terminal determines priority, based on priority values, in step 1151. In other words, the terminal may determine transmission priority between the remaining UL data, excluding the MAC CE, and the sidelink data. To this end, the terminal may compare the priority value of UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 11D:
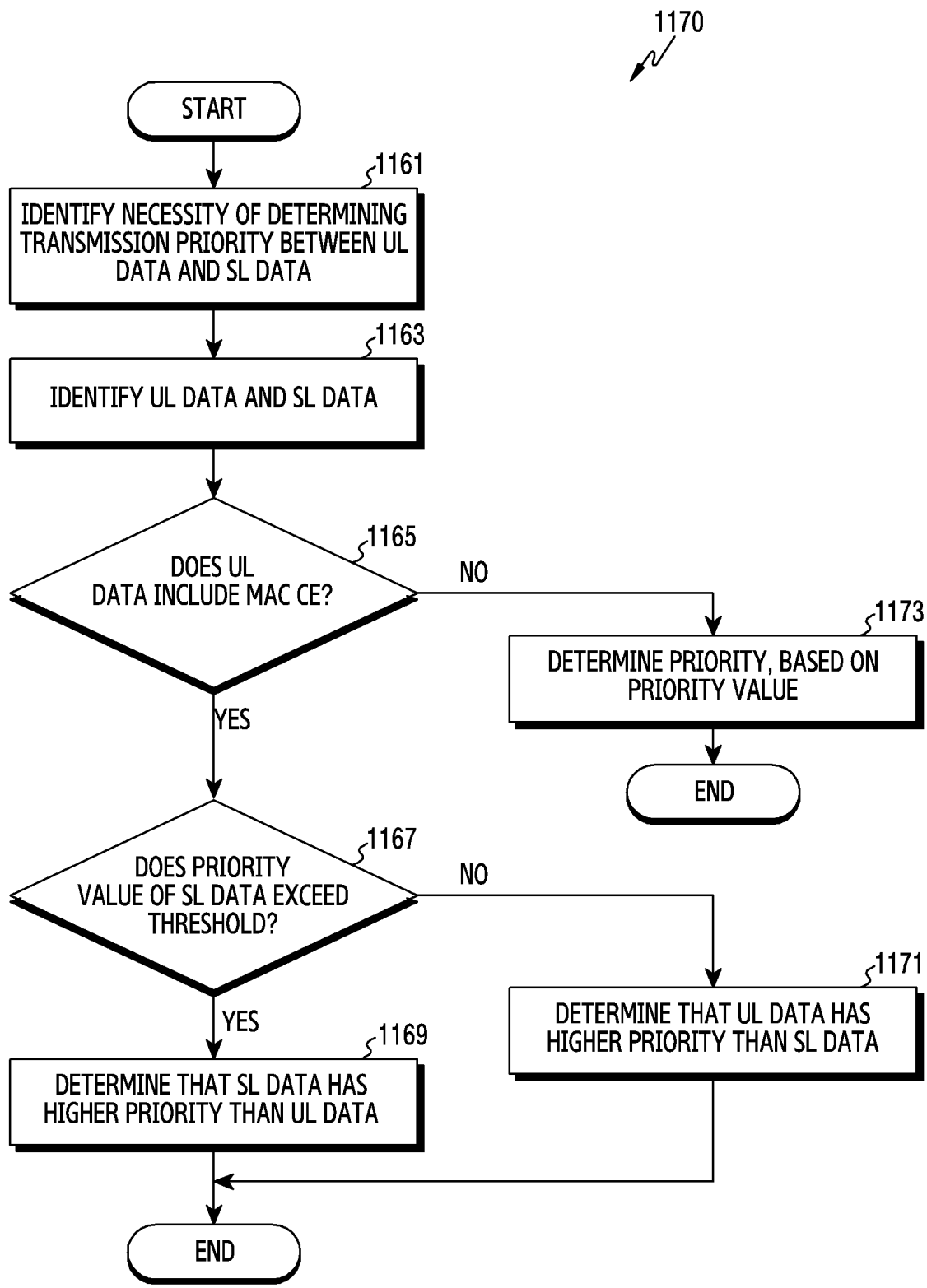
FIG. 11D illustrates a flowchart in which a terminal determines priority between UL data and sidelink data in a wireless communication system, according to an embodiment.

FIG. 11D illustrates a flowchart 1170 in which a terminal determines priority between UL data and sidelink data in a wireless communication system, according to an embodiment. FIG. 11D illustrates an operation method of the terminal 120.

Referring to FIG. 11D, in step 1161, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1163, the terminal identifies UL data and sidelink data. The data may include a MAC PDU. That is, the terminal may identify a combination of data included in the UL data and the sidelink data. In other words, the terminal may determine UL data and sidelink data that are the objects to be determined for transmission priority. In step 1165, the terminal determines whether or not the UL data includes an MAC CE.

If the UL data includes the MAC CE, the terminal compares the priority value of the sidelink data with a threshold in step 1167. In other words, the terminal may determine whether or not the priority value of the sidelink data is greater than a predetermined threshold. For example, in the case where a plurality of pieces of sidelink data is combined, the terminal may compare the priority value of the sidelink data having the highest priority, among the plurality of pieces of sidelink data, with a threshold. In the embodiment, the priority value greater than a threshold indicates that the transmission priority is high. However, according to another embodiment, the priority value less than a threshold may indicate that the transmission priority is high. In this case, step 1165 may be replaced with an operation of determining whether or not the priority value of the sidelink data is less than a predetermined threshold.

If the priority value of the sidelink data is greater than a threshold, the terminal determines that the sidelink data has higher transmission priority than the UL data in step 1169. On the other hand, if the priority value of the sidelink data is not greater than a threshold, the terminal determines that the UL data has higher transmission priority than the sidelink data in step 1171.

If the UL data includes data other than the MAC CE, the terminal determines priority, based on priority values, in step 1173. In other words, the terminal may determine transmission priority between the remaining UL data, excluding the MAC CE, and the sidelink data. To this end, the terminal may compare the priority value of UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

In the case where the terminal is required to determine transmission priority between UL data and sidelink data, the terminal may consider whether or not the UL data is required to be transmitted through a PUCCH. If the UL data is transmitted through the PUCCH, the terminal may determine that the transmission priority of the UL data is higher than that of the sidelink data. If it is determined that the UL data does not need to be transmitted through the PUCCH, the terminal may determine transmission priority between the UL data and the sidelink data according to at least one procedure described with reference to FIGS. 11A to 11D.

In the case where the transmission priority of the UL data transmitted through the PUCCH is not configured to be higher than the sidelink data, if it is determined that the UL data includes a PUCCH, the terminal may perform one of the procedures described with reference to FIGS. 11A to 11D in order to determine priority between the PUCCH and the sidelink data. In this case, in one of the procedures described in FIGS. 11A to 11D, the PUCCH, instead of the MAC CE, may be the object to be determined.

In the case where the transmission priority of an SRB among the UL data is defined to be higher than the sidelink data, if the UL data includes an SRB, the terminal may determine that the transmission priority of the UL data is higher than that of the sidelink data. In the case where the transmission priority of an SRB among the UL data is not defined to be higher than the sidelink data, if the UL data includes an SRB, the terminal may perform one of the procedures described with reference to FIGS. 11A to 11D in order to determine priority between the SRB and the sidelink data. In this case, in one of the procedures described in FIGS. 11A to 11D, the SRB, instead of the MAC CE, may be the object to be determined.

The embodiment in which a terminal uses priority values in order to determine transmission priority between UL data, excluding an MAC CE, and sidelink data has been described with reference to FIGS. 9A to 11D. Next, an embodiment in which a terminal uses priority values or priority configuration values corresponding thereto in order to determine transmission priority between UL data including an MAC CE and sidelink data will be described with reference to FIGS. 12A to 13B.

Figure 12A:
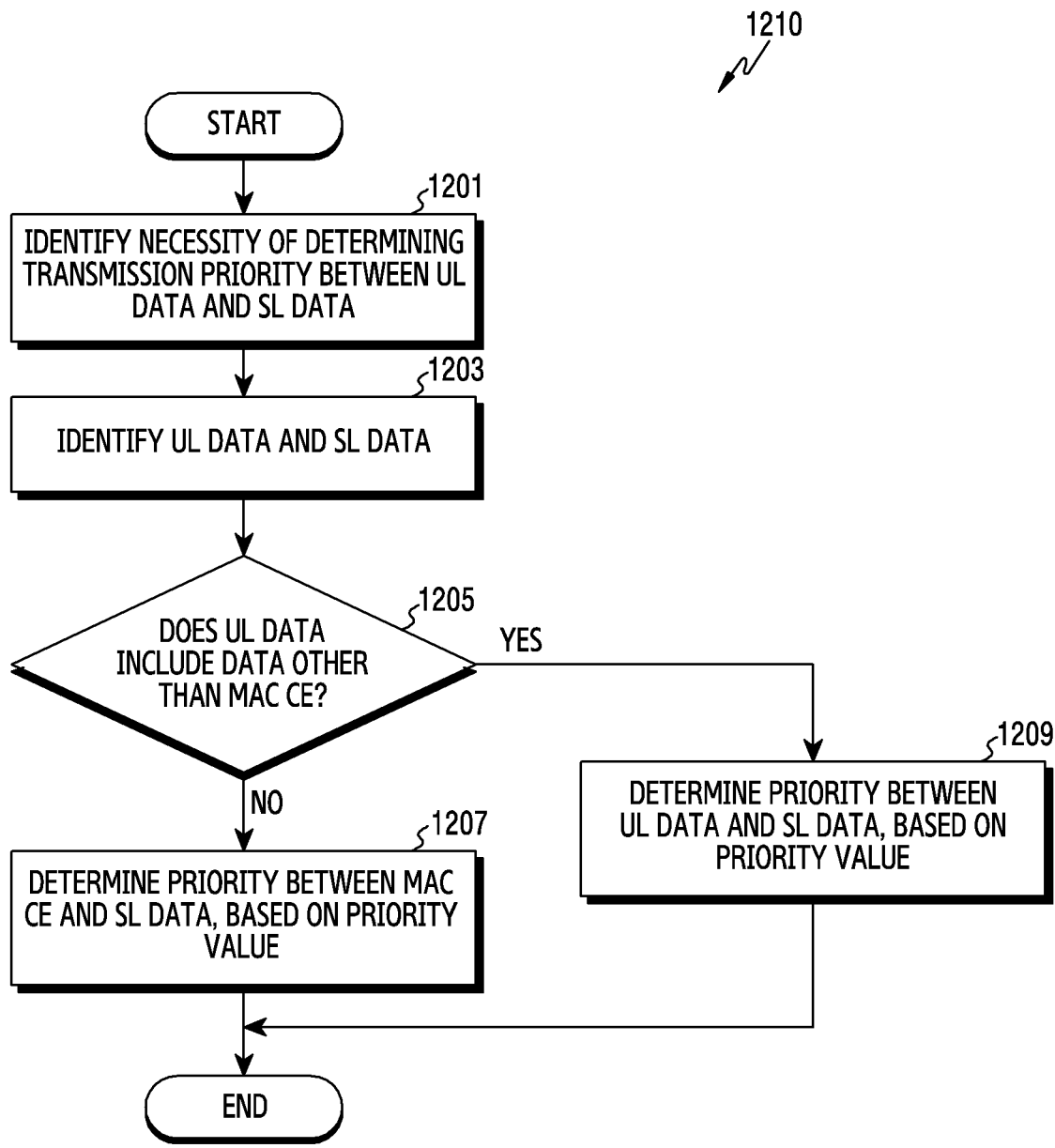
FIG. 12A illustrates a flowchart in which a terminal determines priority between UL data and sidelink data in a wireless communication system, according to an embodiment.

FIG. 12A illustrates a flowchart 1210 in which a terminal determines priority between UL data and sidelink data in a wireless communication system, according to an embodiment. FIG. 12A illustrates an operation method of the terminal 120.

Referring to FIG. 12A, in step 1201, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1203, the terminal identifies UL data and sidelink data. The data may include a MAC PDU. That is, the terminal may identify a combination of data included in the UL data and the sidelink data. In other words, the terminal may determine UL data and sidelink data that are the objects to be determined for transmission priority. In step 1205, the terminal identifies whether or not the UL data includes data other than the MAC CE.

If the UL data does not include data other than the MAC CE, the terminal determines transmission priority between the MAC CE and the sidelink data, based on priority values, in step 1207. To this end, the terminal may compare the priority value of the MAC CE with the priority value of the sidelink data. In the case of comparing priority values of one or more MAC CEs with priority values of one or more pieces of sidelink data, the terminal may select UL data determined to have the highest priority from among the MAC CEs according to the priority values thereof, may select sidelink data determined to have the highest priority from among the sidelink data according to the priority values thereof, and may compare the priority value of the selected MAC CE with the priority value of the selected sidelink data. The priority values of the MAC CEs may be configured in the terminal by a system, or may be pre-stored in the terminal. Even if the terminal pre-stores the priority values of the MAC CEs therein, if the system configures new information about the priority values of the MAC CEs, the terminal may use the information configured by the system.

On the other hand, if the UL data includes data other than the MAC CE, the terminal determines transmission priority between the UL data including the MAC CE and the sidelink data, based on priority values, in step 1209. To this end, the terminal may compare the priority value of the UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 12B:
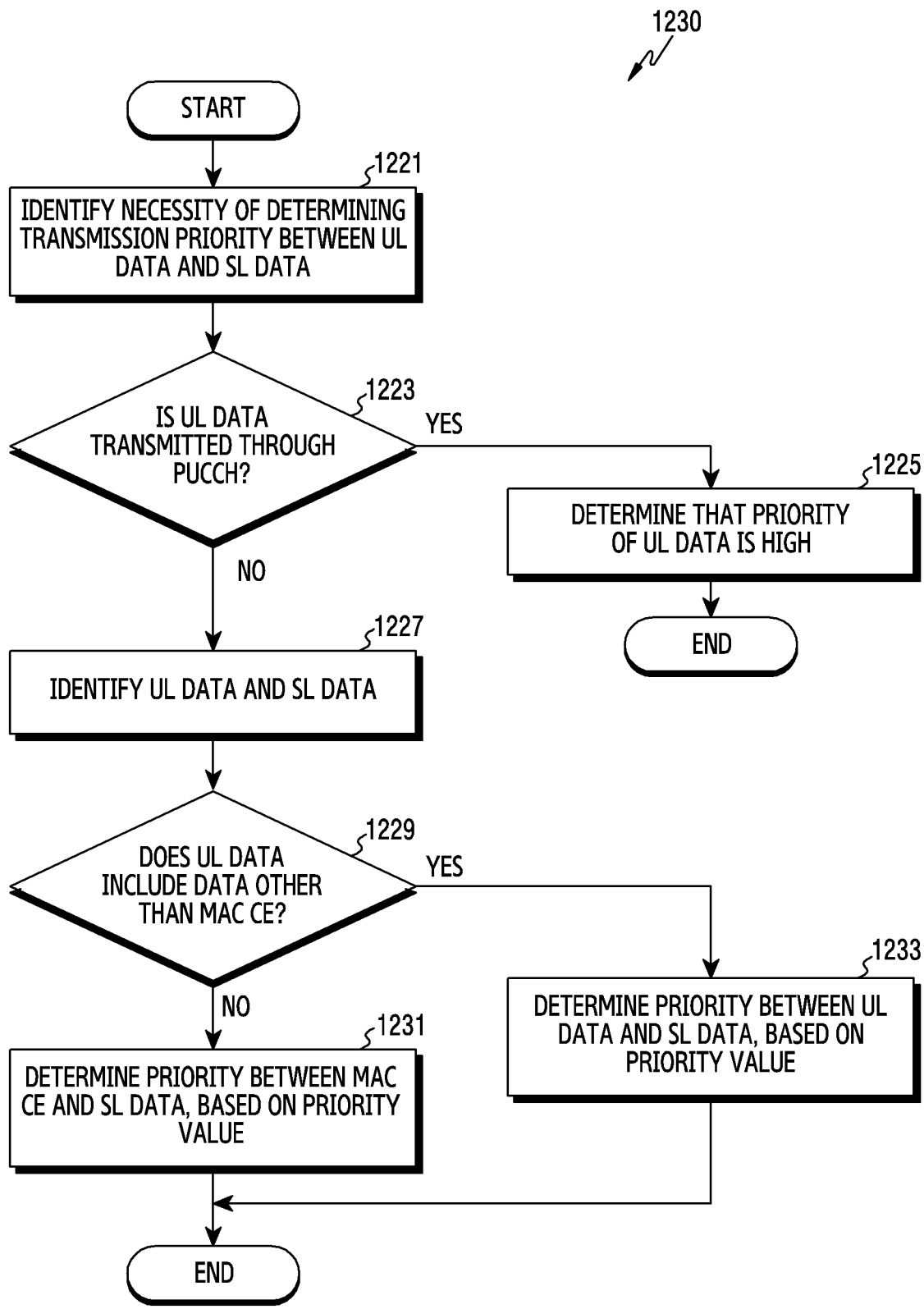
FIG. 12B illustrates a flowchart in which a terminal determines priority between UL data and sidelink data in a wireless communication system, according to an embodiment.

FIG. 12B illustrates a flowchart 1230 in which a terminal determines priority between UL data and sidelink data in a wireless communication system, according to an embodiment. FIG. 12B illustrates an operation method of the terminal 120.

Referring to FIG. 12B, in step 1221, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1223, the terminal determines whether or not the UL data is required to be transmitted through a PUCCH. In other words, the terminal may identify whether or not the data to be transmitted through the PUCCH is pending. If the UL data needs to be transmitted through a PUCCH, the terminal determines that the transmission priority of the UL data is higher in step 1225. On the other hand, if the UL data does not need to be transmitted through the PUCCH, the terminal identifies the UL data and the sidelink data in step 1227. The data may include a MAC PDU. That is, the terminal may identify a combination of data included in the UL data and the sidelink data. In other words, the terminal may determine UL data and sidelink data that are the objects to be determined for transmission priority. In step 1229, the terminal identifies whether or not the UL data includes data other than the MAC CE.

If the UL data does not include data other than the MAC CE, the terminal determines transmission priority between the MAC CE and the sidelink data, based on priority values, in step 1231. To this end, the terminal may compare the priority value of the MAC CE with the priority value of the sidelink data. In the case of comparing priority values of one or more MAC CEs with priority values of one or more pieces of sidelink data, the terminal may select UL data determined to have the highest priority from among the MAC CEs according to the priority values thereof, may select sidelink data determined to have the highest priority from among the sidelink data according to the priority values thereof, and may compare the priority value of the selected MAC CE with the priority value of the selected sidelink data. The priority values of the MAC CEs may be configured in the terminal by a system, or may be pre-stored in the terminal. Even if the terminal pre-stores the priority values of the MAC CEs therein, if the system configures new information about the priority values of the MAC CEs, the terminal may use the information configured by the system.

On the other hand, if the UL data includes data other than the MAC CE, the terminal determines transmission priority between the UL data including the MAC CE and the sidelink data, based on priority values, in step 1233. To this end, the terminal may compare the priority value of the UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

The procedure illustrated in FIG. 12B is an embodiment in which the transmission priority of a PUCCH among the UL data is defined to be higher than that of the sidelink data. In the case where the transmission priority of a PUCCH is not defined to be higher than that of the sidelink data, if the UL data includes a PUCCH, the terminal may perform the procedure described in FIG. 12A in order to determine the priority between the PUCCH and the sidelink data. In this case, the PUCCH, instead of the MAC CE, may be the object to be determined in the procedure described in FIG. 12A, and the priority value of the UL data transmitted through the PUCCH may be configured in the same manner as the embodiment in which the priority value of the MAC CE is operated.

In the case where the transmission priority of an SRB among the UL data is defined to be higher than that of the sidelink data, if the UL data includes an SRB, the terminal may perform the procedure described in FIG. 12B in order to determine the priority between the SRB and the sidelink data. In this case, the SRB, instead of the PUCCH, may be the object to be determined in the procedure described in FIG. 12B.

In the case where the transmission priority of an SRB is not defined to be higher than that of the sidelink data, if the UL data includes an SRB, the terminal may perform the procedure described in FIG. 12A in order to determine the priority between the SRB and the sidelink data. In this case, the SRB, instead of the MAC CE, may be the object to be determined in the procedure described in FIG. 12A.

Figure 13A:
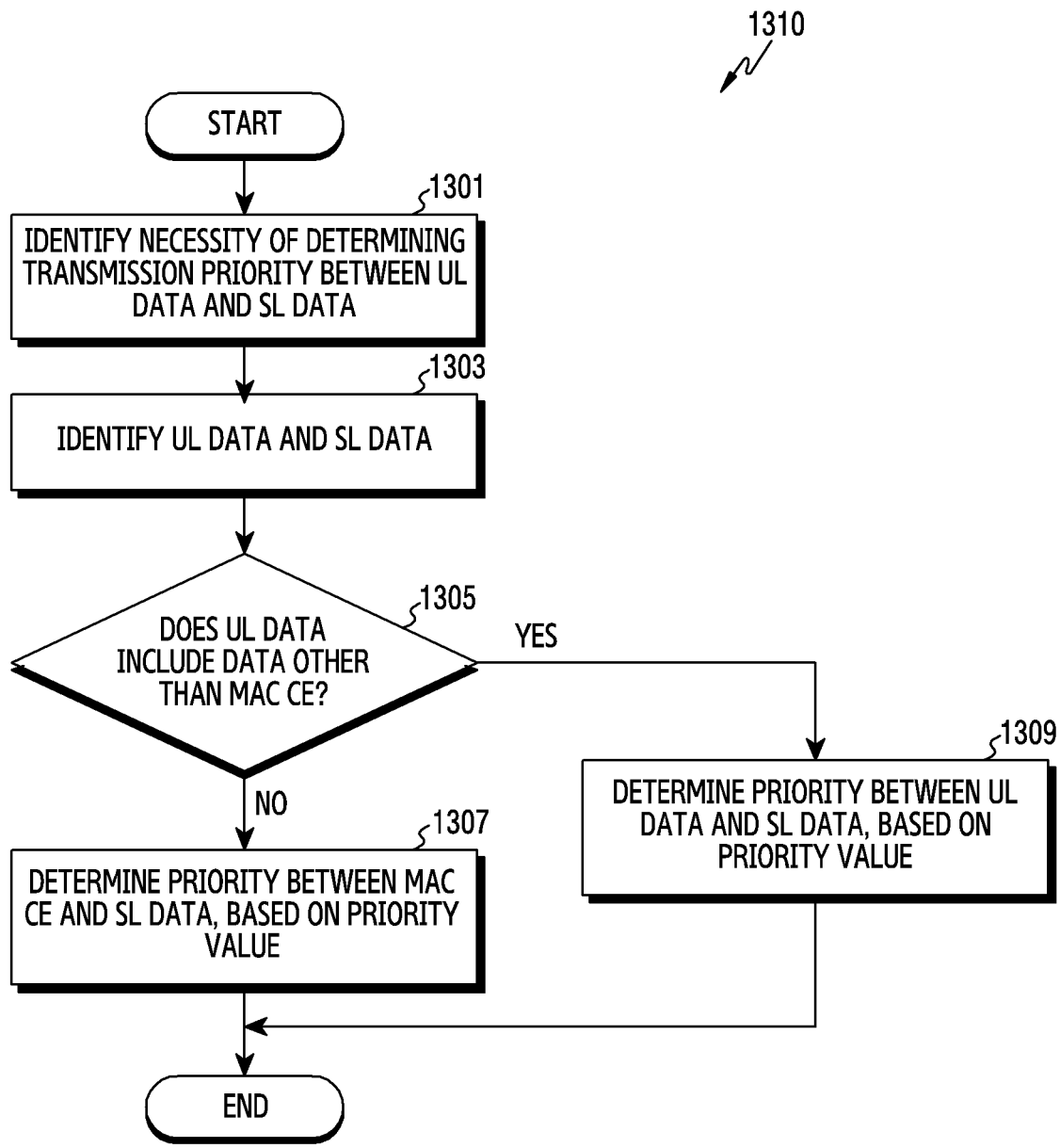
FIG. 13A illustrates a flowchart in which a terminal determines priority between UL data and sidelink data in a wireless communication system, according to an embodiment.

FIG. 13A illustrates a flowchart 1310 in which a terminal determines priority between UL data and sidelink data in a wireless communication system, according to an embodiment. FIG. 13A illustrates an operation method of the terminal 120.

Referring to FIG. 13A, in step 1301, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1303, the terminal identifies UL data and sidelink data. The data may include a MAC PDU. That is, the terminal may identify a combination of data included in the UL data and the sidelink data. In other words, the terminal may determine UL data and sidelink data that are the objects to be determined for transmission priority. In step 1305, the terminal identifies whether or not the UL data includes data other than the MAC CE.

If the UL data does not include data other than the MAC CE, the terminal determines transmission priority between the MAC CE and the sidelink data, based on priority values, in step 1307. To this end, the terminal may compare the priority value of the MAC CE with the priority value of the sidelink data. In the case of comparing priority values of one or more MAC CEs with priority values of one or more pieces of sidelink data, the terminal may select UL data determined to have the highest priority from among the MAC CEs according to the priority values thereof, may select sidelink data determined to have the highest priority from among the sidelink data according to the priority values thereof, and may compare the priority value of the selected MAC CE with the priority value of the selected sidelink data. The priority values of the MAC CEs may be configured in the terminal by a system, or may be pre-stored in the terminal. Even if the terminal pre-stores the priority values of the MAC CEs therein, if the system configures new information about the priority values of the MAC CEs, the terminal may use the information configured by the system.

On the other hand, if the UL data includes data other than the MAC CE, the terminal determines transmission priority between the UL data including the MAC CE and the sidelink data, based on priority values, in step 1309. To this end, the terminal may compare the priority value of the UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Embodiments of priority configuration information used by the terminal to determine transmission priority between the UL data and the sidelink data in step 1307 or step 1309 are shown in Table 1, Table 2, Table 3, or Table 4, below. The transmission priority decreases according to alphabetical order in Table 1, Table 2, Table 3, and Table 4. For example, in Table 1, (a) indicates the highest priority, and (h) indicates the lowest priority.

TABLE 1

(a) C-RNTI MAC CE or data from UL-CCCH; PC5-RRC; (a-1) capable of
indicating PC5-S;
(b) Configured Grant Confirmation MAC CE;
(c) MAC CE for BSR, with exception of BSR included for padding;
(d) Single Entry PHR MAC CE or Multiple Entry PHR MAC CE;
(e) MAC control element for Sidelink BSR, with exception of Sidelink BSR
included for padding; data from any UL Logical Channel, except data from UL-
CCCH; data from any SL Logical Channel, except PC5-RRC; (e-1) data TABLE 1-continued from
any Logical Channel, except PC5-RRC and PC5-S
(f) MAC CE for Recommended bit rate query;
(g) MAC CE for BSR included for padding.
(h) MAC control element for Sidelink BSR included for padding.

In Table 1, (a-1) indicates the case in which the PC5-S is configured as the same priority as "C-RNTI MAC CE or data from UL-CCCH; PC5-RRC", which is the priority of (a), and, in this case, the terminal may determine transmission priority in consideration of (e-1).

Priority values may be configured for each of the UL data and the sidelink data configured as the priority of (e), that is, "data from any UL logical channel, except data from UL-CCCH; data from any sidelink logical channel, except PC5-RRC" or for each of the UL data and the sidelink data configured as the priority of (e-1), that is, "data from any UL logical channel, except data from UL-CCCH; data from any sidelink logical channel, except PC5-RRC and PC5-S". The priority values may be configured in the same manner as in the above embodiment, using the priority values.

TABLE 2

(a) C-RNTI MAC CE or data from UL-CCCH;
(b) Configured Grant Conformation MAC CE;
(c) MAC CE for BSR, with exception of BSR included for padding;
(d) Single Entry PHR MAC CE or Multiple Entry PHR MAC CE;
(e) MAC control element for Sidelink BSR, with exception of Sidelink BSR
included for padding;
data from any UL Logical Channel, except data from UL-CCCH; data from
SL logical channel including PC5-RRC;
(f) MAC CE for Recommended bit rate query;
(g) MAC CE for BSR included for padding.
(h) MAC control element for Sidelink BSR included for padding.

In Table 2, priority values may be configured for each of the UL data and the sidelink data configured as the priority of (e), that is, "data from any UL logical channel, except data from UL-CCCH; data from sidelink logical channel including PC5-RRC". The priority values may be configured in the same manner as in the above embodiment, using the priority values.

TABLE 3

(a) C-RNTI MAC CE or data from UL-CCCH; PC5-RRC; (a-1) capable of
including PC5-S
(b) Configured Grant Confirmation MAC CE;
(c) MAC CE for BSR, with exception of BSR included for padding;
(d) Single Entry PHR MAC CE or Multiple Entry PHR MAC CE;
(e) MAC control element for Sidelink BSR, with exception of Sidelink BSR
included for padding;
(f) data from any UL Logical Channel, except data from UL-CCCH; data
from any SL Logical Channel, except PC5-RRC; (f-1) data from any
Logical Channel, except PC5-RRC and PC5-S
(g) MAC CE for Recommended bit rate query;
(h) MAC CE for BSR included for padding.
(i) MAC control element for Sidelink BSR included for padding.

(a-1) in Table 3 indicates the case in which the PC5-S is configured as the same priority as "C-RNTI MAC CE or data from UL-CCCH; PC5-RRC", which is the priority of (a), and, in this case, the terminal may determine transmission priority in consideration of (f-1).

Priority values may be configured for each of the UL data and the sidelink data configured as the priority of (f), that is, "data from any UL Logical Channel, except data from UL-CCCH; data from any SL Logical Channel, except PC5-RRC" or for each of the UL data and the sidelink data configured as the priority of (f-1), that is, "data from any UL Logical Channel, except data from UL-CCCH; data from any SL Logical Channel, except PC5-RRC and PC5-S". The priority values may be configured in the same manner as in the above embodiment, using the priority values.

TABLE 4

(a) C-RNTI MAC CE or data from UL-CCCH;
(b) Configured Grant Confirmation MAC CE;
(c) MAC CE for BSR, with exception of BSR included for padding;
(d) Single Entry PHR MAC CE or Multiple Entry PHR MAC CE;
(e) MAC control element for Sidelink BSR, with exception of Sidelink BSR
included for padding;
(f) data from any UL Logical Channel, except data from UL-CCCH; data
from SL logical channel including PC5-RRC;
(g) MAC CE for Recommended bit rate query;
(h) MAC CE for BSR included for padding.
(i) MAC control element for Sidelink BSR included for padding.

In Table 4, priority values may be configured for each of the UL data and the sidelink data configured as the priority of (f), that is, "data from any UL logical channel, except data from UL-CCCH; data from sidelink logical channel including PC5-RRC". The priority values may be configured in the same manner as in the above embodiment, using the priority values.

The examples of priority configuration of (a) to (i) correspond to the configuration in order to allow the transmission priority of the sidelink data to correspond to the transmission priority of the UL data. This may be used to determine the transmission priority between UL data, excluding UL data transmitted through a UL CCCH, and sidelink data. The criteria for configuring the priority of (a) to (i) for the sidelink data and the UL data may be determined in consideration of the QoS profiles (requirements) of service packets transmitted and received through the sidelink and the UL. The QoS profile may include, for example, at least one of urgency, low latency, high reliability, and high speed of a service packet. The criteria for configuring the priority of (a) to (i) for the MAC CE may be determined based on whether or not MAC CE is intended to control the radio resources required for the service packets transmitted and received through the sidelink or the UL. The MAC CE, which is required to be processed prior to the service packet, may be configured to have a higher transmission priority value among (a) to (i). The MAC CE, which is determined to not be urgently processed and is required to be processed later than the service packet may be configured to have a lower transmission priority value among (a) to (i).

With regard to the transmission priority for "MAC CE for BSR, with exception of BSR included for padding" (hereinafter, referred to as "BSR MAC CE") and "MAC CE for sidelink BSR, with exception of sidelink BSR included for padding" (hereinafter, referred to as "SL BSR MAC CE"), the case in which the BSR MAC CE is determined to have higher transmission priority than the SL BSR MAC CE has been described with reference to the examples in Table 1 to Table 4.

The transmission priority of the BSR MAC CE and the SL BSR MAC CE may be defined, regardless of the examples in Table 1 to Table 4. For example, the transmission priority of the BSR MAC CE or the SL BSR MAC CE may be determined based on the transmission priority of each UL data or sidelink data to be transmitted in the resources allocated to the terminal in response to reporting the BSR MAC CE or the SL BSR MAC CE to the base station. Accordingly, the QoS profiles (requirements) required for the UL data or the sidelink data may be supported.

If it is determined that the transmission priority of UL data to be transmitted using a resource allocated in response to a report of the BSR MAC CE to the base station being higher than the transmission priority of sidelink data to be transmitted using a resource allocated in response to a report of the SL BSR MAC CE to the base station, the terminal may determine that the transmission priority of the BSR MAC CE is higher than the transmission priority of the SL BSR MAC CE. In this case, the terminal may compare the transmission priority of UL data determined to have the highest transmission priority, among one or more pieces of UL data to be transmitted in the resource allocated in the response to report of the BSR MAC CE, with the transmission priority of sidelink data determined to have the highest transmission priority, among one or more pieces of sidelink data to be transmitted in the resource allocated in response to the report of the SL BSR MAC CE.

If it is determined that the transmission priority of UL data to be transmitted using a resource allocated in response to a report of a BSR MAC CE to the base station is lower than the transmission priority of sidelink data to be transmitted using a resource allocated in response to a report of an SL BSR MAC CE to the base station, the terminal may determine that the transmission priority of the BSR MAC CE is lower than the transmission priority of the SL BSR MAC CE. In this case, the terminal may compare the transmission priority of UL data determined to have the highest transmission priority, among one or more pieces of UL data to be transmitted in the resource allocated in response to the report of the BSR MAC CE, with the transmission priority of sidelink data determined to have the highest transmission priority, among one or more pieces of sidelink data to be transmitted in the resource allocated in response to the report of the SL BSR MAC CE.

In the case where the terminal determines transmission priority between one or more MAC CEs and one or more pieces of sidelink data in step 1307 in FIG. 13A, the terminal may select the MAC CE determined to have the highest priority from among the MAC CEs, based on Table 1, Table 2, Table 3, or Table 4, and may select the sidelink data determined to have the highest priority from among the sidelink data, based on Table 1, Table 2, Table 3 or Table 4. The terminal may determine the transmission priority for the selected MAC CE and the selected sidelink data.

For example, if it is determined that the priority of at least one MAC CE corresponding to the UL data is configured as one of (a) to (e) in Table 1, Table 2, Table 3 or Table 4, in step 1307, the terminal determines that the transmission priority of the UL data is higher than the transmission priority of the sidelink data. If it is determined that the priority of at least one MAC CE corresponding to the UL data is not configured as one of (a) to (e) in Table 1, Table 2, Table 3 or Table 4, in step 1307, the terminal determines that the transmission priority of the sidelink data is higher than the transmission priority of the UL data.

In the case where the terminal determines transmission priority between one or more pieces of UL data and one or more pieces of sidelink data in step 1309, the terminal may select the UL data determined to have the highest priority from among the UL data, based on Table 1, Table 2, Table 3, or Table 4, and may select the sidelink data determined to have the highest priority from among the sidelink data, based on Table 1, Table 2, Table 3, or Table 4. The terminal may determine the transmission priority for the selected UL data and the selected sidelink data.

In step 1309, in a method in which the terminal determines the transmission priority in the case of one or more pieces of UL data configured with priority values, "priority 1" is further added to the priority value of the UL data determined to have the highest priority, based on the priority values. For example, in the case of configuring one of 16-level priority values, it is determined the lower the priority value from 1 to 16 (or 0 to 15), the higher the transmission priority. Thus, the priority values of the UL data may be compared for priority with the priority of the sidelink data in the range of 0 to 15. If the priority value of the UL determined to have the highest priority, among one or more pieces of UL data is 3, the system may determine that the priority value of the UL data is 2 by further adding priority 1 thereto.

Although it has been described in FIG. 13A that Table 1, Table 2, Table 3, and Table 4 include an SRB among the UL data and a PC5-RRC or a PC5-S among the sidelink data, the priority configuration in Tables 1 to 4 may not be applied to at least one of the SRB, the PC5-RRC, and the PC5-S. In this case, the system may configure the priority in the terminal for at least one of the SRB, the PC5-RRC, and the PC5-S.

The UL data may include at least one of an SRB and a DRB. The priority values for the UL data may be configured in the terminal by the system. The sidelink data may include at least one of a PC5-RRC, a PC5-S, and an SL-DRB. The priority values for sidelink data may be configured in the terminal by the system.

Figure 13B:
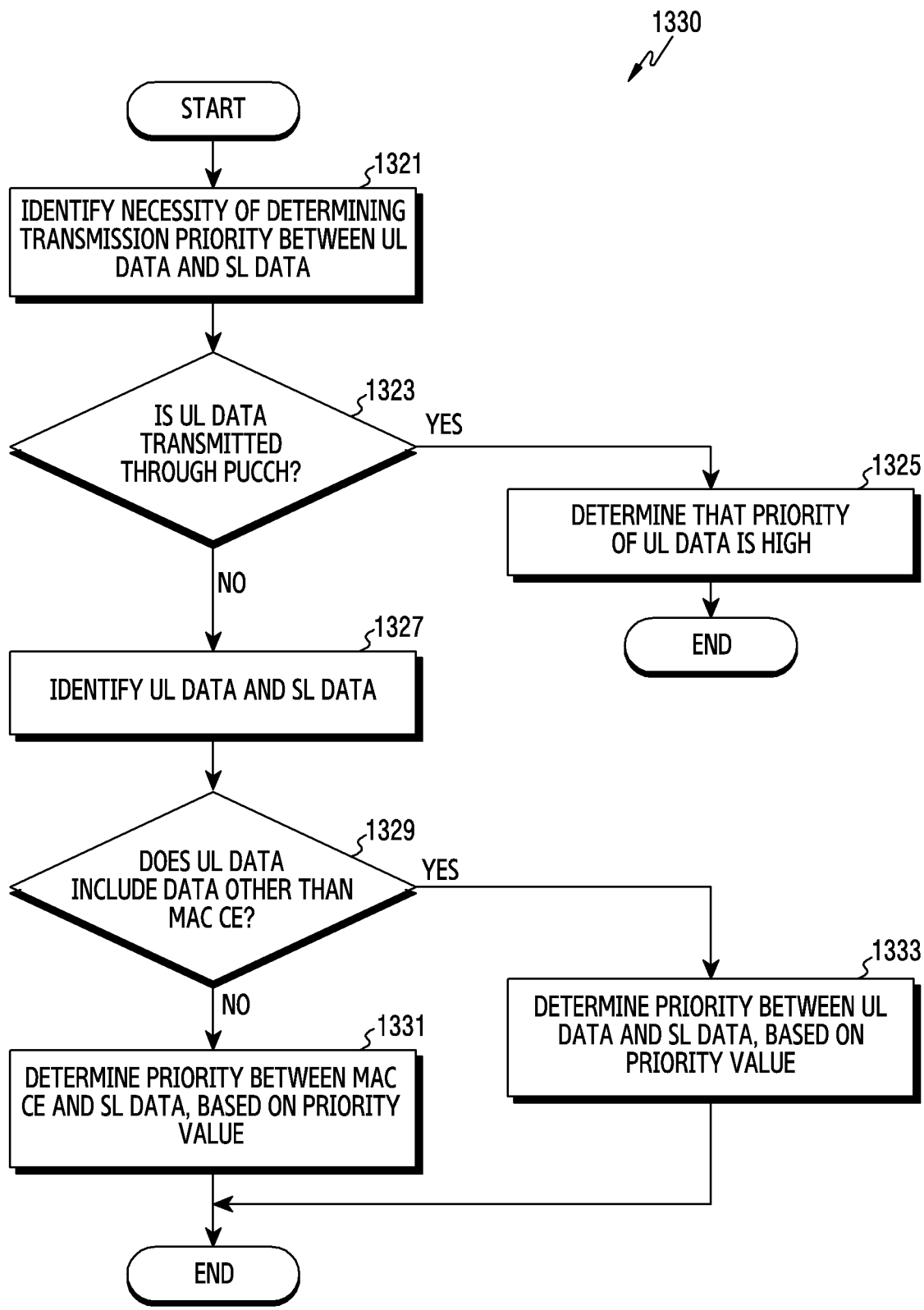
FIG. 13B illustrates a flowchart in which a terminal determines priority between UL data and sidelink data in a wireless communication system, according to an embodiment.

FIG. 13B illustrates a flowchart 1330 in which a terminal determines priority between UL data and sidelink data in a wireless communication system, according to an embodiment. FIG. 13B illustrates an operation method of the terminal 120.

Referring to FIG. 13B, in step 1321, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1323, the terminal determines whether or not the UL data is required to be transmitted through a PUCCH. In other words, the terminal may identify whether or not the data to be transmitted through the PUCCH is pending. If the UL data needs to be transmitted through a PUCCH, the terminal determines that the transmission priority of the UL data is higher in step 1325. On the other hand, if the UL data does not need to be transmitted through the PUCCH, the terminal identifies the UL data and the sidelink data in step 1327. The data may include a MAC PDU. That is, the terminal may identify a combination of data included in the UL data and the sidelink data. In other words, the terminal may determine UL data and sidelink data that are the objects to be determined for transmission priority. In step 1329, the terminal identifies whether or not the UL data includes data other than the MAC CE.

If the UL data does not include data other than the MAC CE, the terminal determines transmission priority between the MAC CE and the sidelink data, based on priority values, in step 1331. To this end, the terminal may compare the priority value of the MAC CE with the priority value of the sidelink data. In the case of comparing priority values of one or more MAC CEs with priority values of one or more pieces of sidelink data, the terminal may select UL data determined to have the highest priority from among the MAC CEs according to the priority values thereof, may select sidelink data determined to have the highest priority from among the sidelink data according to the priority values thereof, and may compare the priority value of the selected MAC CE with the priority value of the selected sidelink data. The priority values of the MAC CEs may be configured in the terminal by a system, or may be pre-stored in the terminal. Even if the terminal pre-stores the priority values of the MAC CEs, if the system configures new information about the priority values of the MAC CEs, the terminal may use the information configured by the system.

On the other hand, if the UL data includes data other than the MAC CE, the terminal determines transmission priority between the UL data including the MAC CE and the sidelink data, based on priority values, in step 1333. To this end, the terminal may compare the priority value of the UL data with the priority value of the sidelink data. In the case of comparing priority values of one or more pieces of UL data with priority values of one or more pieces of sidelink data, the terminal may select UL data determined to have the highest priority from among the UL data according to the priority values thereof, may select sidelink data determined to have the highest priority from among the sidelink data according to the priority values thereof, and may compare the priority value of the selected UL data with the priority value of the selected sidelink data. The UL data may include at least one of an SRS and a DRB. The priority values for the UL data may be configured in the terminal by the system. The sidelink data may include at least one of a PC5-RRC, a PC5-S, and an SL-DRB. The priority values for sidelink data may be configured in the terminal by the system.

The procedure illustrated in FIG. 13B is an embodiment in which the transmission priority of a PUCCH among the UL data is defined to be higher than that of the sidelink data. In the case where the transmission priority of a PUCCH is not defined to be higher than that of the sidelink data, if the UL data includes a PUCCH, the terminal may perform the procedure described in FIG. 13A in order to determine the priority between the PUCCH and the sidelink data. In this case, the PUCCH, instead of the MAC CE, may be the object to be determined in the procedure described in FIG. 13A, and the priority configuration of the PUCCH may be added to Table 1, Table 2, Table 3, and Table 4.

In the case where the transmission priority of an SRB among the UL data is defined to be higher than that of the sidelink data, if the UL data includes an SRB, the terminal may perform the procedure described in FIG. 13B in order to determine the priority between the SRB and the sidelink data. In this case, the SRB, instead of the PUCCH, may be the object to be determined in the procedure described in FIG. 13B.

In the case where the transmission priority of an SRB is not defined to be higher than that of the sidelink data, if the UL data includes an SRB, the terminal may perform the procedure described in FIG. 13A in order to determine the priority between the SRB and the sidelink data. In this case, the SRB, instead of the MAC CE, may be the object to be determined in the procedure described in FIG. 13A, and the priority configuration of the SRB may be added to Table 1, Table 2, Table 3, and Table 4.

Meanwhile, in determining the transmission priority between the UL data including a MAC CE and the sidelink data according to FIGS. 9A to 13B, the determination that the priority of the UL data including at least one MAC CE is higher than that of the sidelink data is based on the fact that the MAC CE must have a higher transmission priority than normal data because the MAC CE is data including information that is required to be quickly transmitted to a receiving entity and then be quickly processed. The determination that the priority of the sidelink data is higher than that of the UL data including at least one MAC CE is based on the fact that the sidelink data must have a higher transmission priority because the QoS profiles required for the sidelink data, that is, requirements thereof, are data including information requesting lower latency, higher reliability, higher speed, and higher urgency than the MAC CE.

The terminal may determine the transmission priority between the UL data and the sidelink data according to at least one of the embodiments described with reference to FIGS. 9A to 13B, and may perform operations, which will be described with reference to FIG. 14A or 14B below, on the data of the link, which is determined to be preferentially transmitted, and the data of the link, which is not determined to be preferentially transmitted.

Figure 14A:
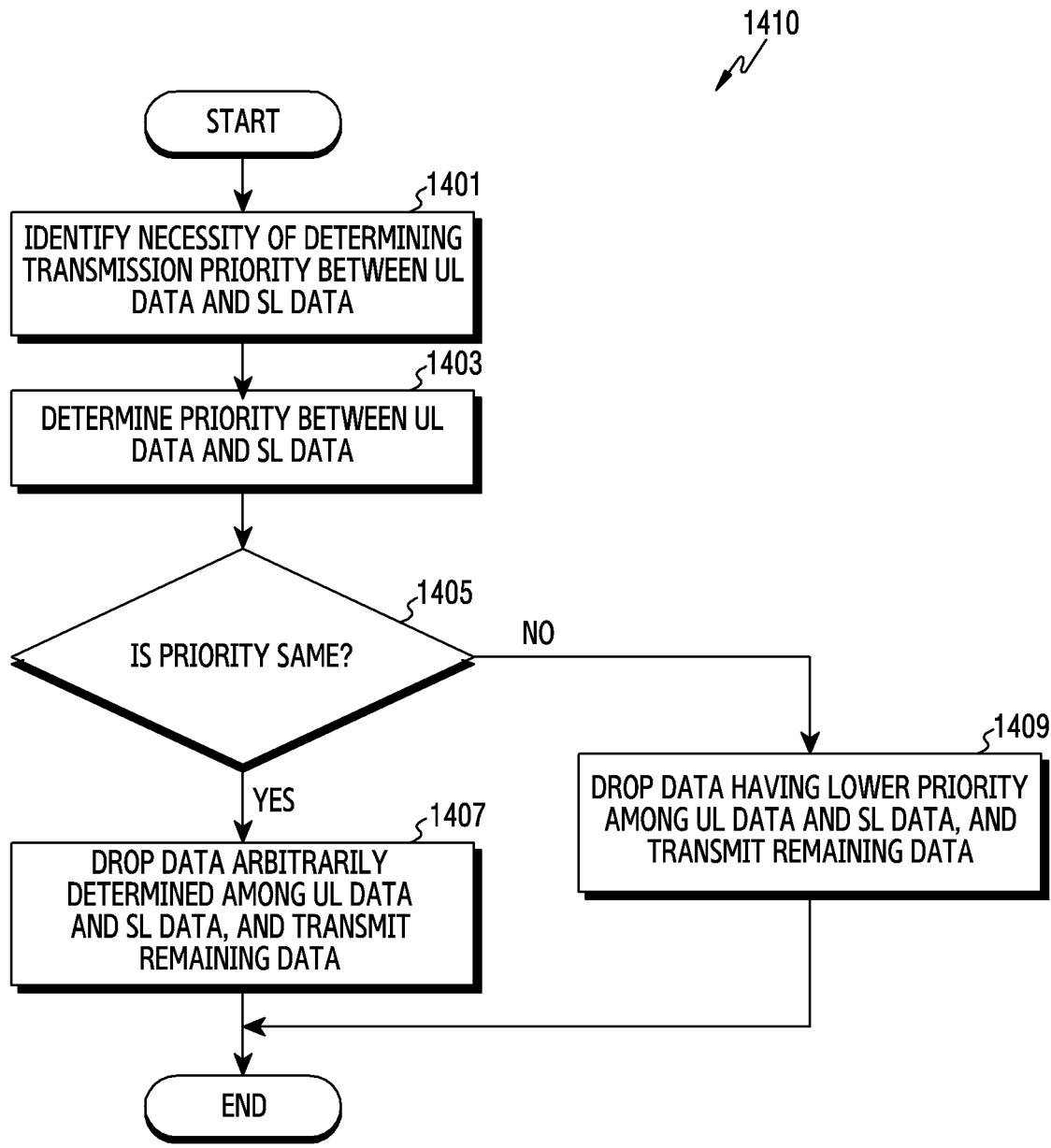
FIG. 14A illustrates a flowchart of a terminal after determining priority between UL data and sidelink data in a wireless communication system, according to an embodiment.

FIG. 14A illustrates a flowchart 1410 of a terminal after determining priority between UL data and sidelink data in a wireless communication system, according to an embodiment. FIG. 14A illustrates an operation method of the terminal 120.

Referring to FIG. 14A, in step 1401, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1403, the terminal determines transmission priority between the UL data and the sidelink data. For example, the terminal may determine transmission priority between the UL data and the sidelink data according to any of the embodiments described with reference to FIGS. 9A to 13B.

In step 1405, the terminal determines whether or not the transmission priority determined in step 1403 is the same between the UL data and the sidelink data. If it is determined that the transmission priority is the same between the UL and the sidelink, the terminal selects any of the sidelink and the UL, thereby determining to transmit the data thereof, and drops the data of the remaining link in step 1407. On the other hand, if it is determined that the transmission priority is not the same between the UL and the sidelink, the terminal drops the data of the link determined to have low transmission priority, and transmits the data of the link determined to have high transmission priority in step 1409.

Figure 14B:
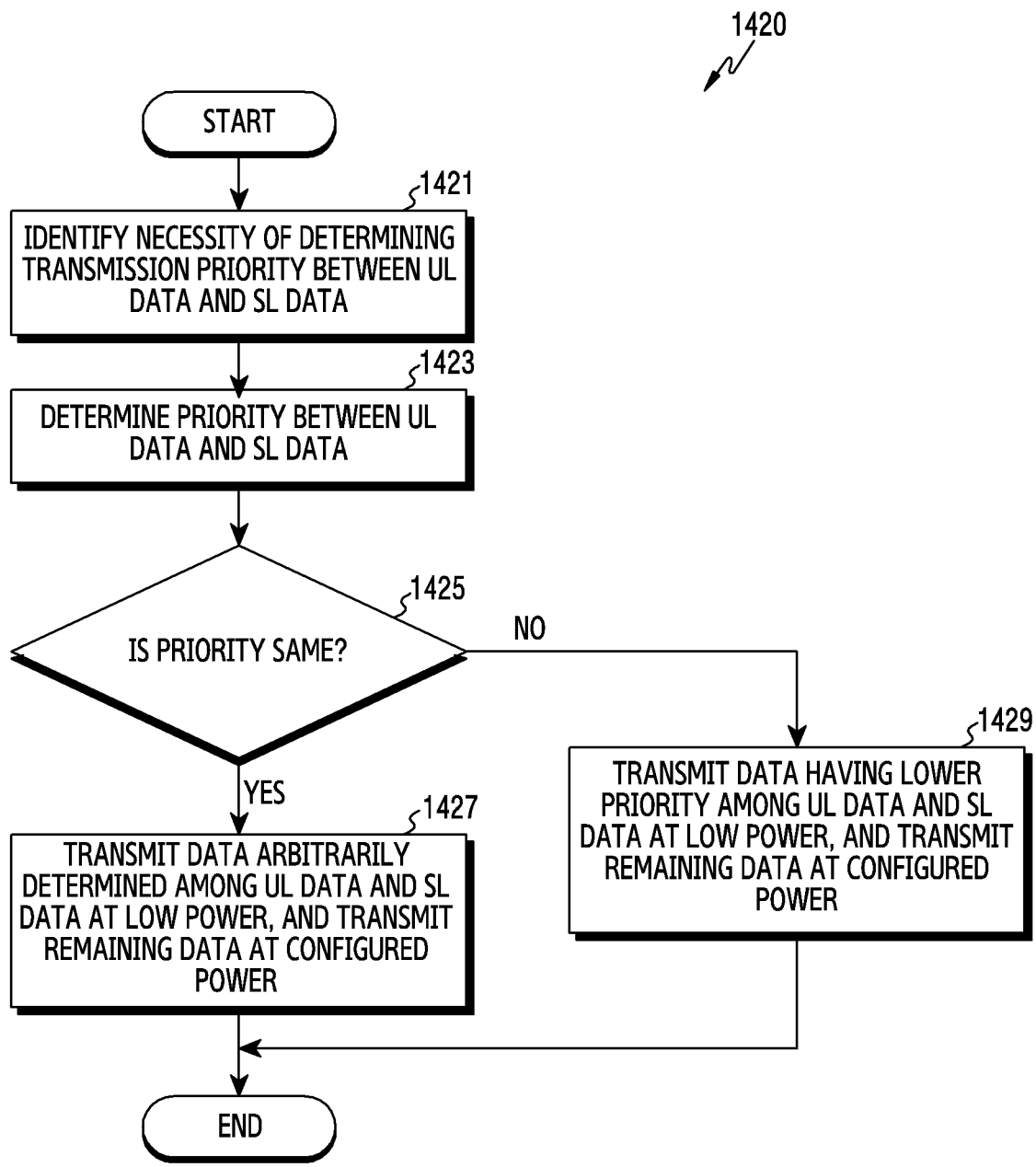
FIG. 14B illustrates a flowchart of a terminal after determining priority between UL data and sidelink data, according to an embodiment.

FIG. 14B illustrates a flowchart 1430 of a terminal after determining priority between UL data and sidelink data, according to an embodiment. FIG. 14B illustrates an operation method of the terminal 120.

Referring to FIG. 14B, in step 1421, the terminal identifies the necessity of determining transmission priority between UL data and sidelink data. For example, the terminal may need to determine transmission priority between the UL data and the sidelink data if it is determined that the terminal is unable to simultaneously transmit the UL data and the sidelink data, or that the terminal is unable to simultaneously transmit the UL data and the sidelink data at predetermined power levels for the respective links due to limitations of hardware of the terminal.

In step 1423, the terminal determines transmission priority between the UL data and the sidelink data. For example, the terminal may determine the transmission priority between the UL data and the sidelink data according to any one of the embodiments described with reference to FIGS. 9A to 13B.

In step 1425, the terminal determines whether or not the transmission priority determined in step 1423 is the same between the UL data and the sidelink data. If it is determined that the transmission priority is the same between the UL and the sidelink, the terminal may select any one of the sidelink and the UL, thereby transmitting data thereof at a configured transmission power level, and transmitting data of the remaining link at a transmission power level lower than the configured transmission power in step 1427. The configured transmission power indicates the power determined by the terminal or indicated by the base station according to a power control algorithm adopted by the system.

On the other hand, if it is determined that the transmission priority is not the same between the UL and the sidelink, the terminal transmits data of the link determined to have a lower transmission priority at a transmission power level lower than a configured transmission power, and transmits data of the link determined to have a high transmission priority at the configured transmission power level in step 1429. The configured transmission power indicates the power determined by the terminal or indicated by the base station according to a power control algorithm adopted by the system.

UL packets may include at least one of a packet transmitted in a UL data bearer logical channel, a packet transmitted in a signalling bearer logical channel, and a UL MAC CE. Sidelink packets may include at least one of a packet transmitted in the sidelink data bearer logical channel, a packet transmitted in the sidelink signalling bearer logical channel, and a sidelink MAC CE. In this case, transmission priority between the UL packets and the sidelink packets may be processed as follows.

The terminal may compare a transmission priority value configured in the logical channel of the packet transmitted in the UL data bearer with a configured threshold. If the packet transmitted in the UL data bearer includes a plurality of logical channels, the terminal may compare the transmission priority value of a logical channel having the largest transmission priority value, among the plurality of logical channels, with a configured threshold.

The terminal may compare a transmission priority value configured in the logical channel of the packet transmitted in the UL signalling bearer with a configured threshold. For example, if the packet transmitted in the UL signalling bearer includes a plurality of logical channels, the terminal may compare the transmission priority value of a logical channel having the largest transmission priority value, among the plurality of logical channels, with a configured threshold.

The terminal may compare a transmission priority value configured in the UL MAC CE with a configured threshold. For example, if a plurality of UL MAC CEs is included, the terminal may compare the transmission priority value of a MAC CE having the largest transmission priority value, among the plurality of UL MAC CEs, with a configured threshold.

If a separate transmission priority value is not configured for the UL MAC CE, the transmission priority value of the MAC CE may be configured based on the transmission priority value of the logical channel of the UL data bearer corresponding to the MAC CE, or may be configured based on the transmission priority value of the logic channel of the UL signalling bearer. For example, the transmission priority of a UL BSR MAC CE may be configured based on the transmission priority value of the logical channel reported by a UL BSR MAC CE. If one UL BSR MAC CE includes information about a plurality of logical channels, the transmission priority of the corresponding UL BSR MAC CE may be configured based on the largest transmission priority value among a plurality of transmission priority values of the plurality of logical channels.

If the UL packet to be transmitted includes at least one of a packet transmitted in the data bearer logical channel, a packet transmitted in the signalling bearer logical channel, and a MAC CE, the terminal may compare the transmission priority value of a packet having the largest transmission priority value with a configured threshold.

The terminal may compare the transmission priority value, configured in the logical channel of a packet transmitted in the sidelink data bearer, with a configured threshold. If the packet transmitted in the sidelink data bearer includes a plurality of logical channels, the terminal may compare the transmission priority value of a logical channel having the largest transmission priority value, among the plurality of logical channels, with a configured threshold.

The terminal may compare the transmission priority value, configured in the logical channel of a packet transmitted in the sidelink signalling bearer, with a configured threshold. If the packet transmitted in the sidelink signalling bearer includes a plurality of logical channels, the terminal may compare the transmission priority value of a logical channel having the largest transmission priority value, among the plurality of logical channels, with a configured threshold.

The terminal may compare the transmission priority value configured in the sidelink MAC CE with a configured threshold. If a plurality of sidelink MAC CEs is included, the terminal may compare the transmission priority value of a MAC CE having the largest transmission priority value, among the plurality of sidelink MAC CEs, with a configured threshold.

If a separate transmission priority value is not configured for the sidelink MAC CE, the transmission priority value of the MAC CE may be configured based on the transmission priority value of a logical channel of the sidelink data bearer corresponding to the MAC CE, or may be configured based on the transmission priority value of the logical channel of the sidelink signalling bearer.

If the sidelink packet to be transmitted includes at least one of a packet transmitted in the data bearer logical channel, a packet transmitted in the signalling bearer logical channel, and a MAC CE, the terminal may compare the transmission priority value of a packet having the largest transmission priority value with a configured threshold.

The transmission priority threshold of the UL packet and/or the transmission priority threshold of the sidelink packet may be configured for the terminal, and may be configured as the same value or different values.

With regard to the transmission priority between the UL packet and the sidelink packet, if it is determined that the transmission priority value of the UL packet is greater than a threshold and that the transmission priority value of the sidelink packet is less than a threshold, the terminal may determine that the transmission priority of the UL packet is higher. Otherwise, the terminal may determine that the transmission priority of the sidelink packet is higher.

With regard to the transmission priority between the UL packet and the sidelink packet, if it is determined that the transmission priority value of the UL packet is lower than a threshold and that the transmission priority value of the sidelink packet is greater than a threshold, the terminal may determine that the transmission priority of the UL packet is higher. Otherwise, the terminal may determine that the transmission priority of the sidelink packet is higher.

The embodiments of the UL physical signalling transmitted at least in the PUSCH or the PUCCH may include at least one of hybrid automatic repeat request (HARQ) feedback, a scheduling request (SR) RSRP (reference signal received power), a beam measurement, a channel quality indicator (CQI), a CSI-RS (channel state information reference signal), and a sounding reference signal (SRS). The embodiments of the sidelink physical signalling transmitted in the sidelink physical channel may include at least one of HARQ feedback, sidelink-RSRP, sidelink-CQI, and sidelink-SRS.

As a method of determining transmission priority of UL physical signalling or sidelink physical signalling, at least one of the five (5) embodiments described below may be applied, and the method of determining transmission priority may be applied differently depending on the physical signalling.

1. A Transmission Priority Value May Be Configured for UL Physical Signalling.

The terminal may compare the transmission priority value of the UL physical signalling with a configured threshold. If a plurality of UL physical signalling is included, the terminal may compare the transmission priority value of the physical signalling having the largest transmission priority value, among the plurality of UL physical signalling, with a configured threshold.

A transmission priority value may be configured for sidelink physical signalling. The terminal may compare the transmission priority value of the sidelink physical signalling with a configured threshold. If a plurality of sidelink physical signalling is included, the terminal may compare the transmission priority value of the physical signalling having the largest transmission priority value, among the plurality of sidelink physical signalling, with a configured threshold.

In the case of (1), the terminal may compare the sidelink signalling having the largest transmission priority value for at least one of the sidelink physical layer signalling and the sidelink packet, which are to be transmitted, with a configured threshold, and may compare the UL signalling having the largest transmission priority value for at least one of the UL physical layer signalling and the UL packet, which are to be transmitted, with a configured threshold. If it is determined that the transmission priority value of the sidelink signalling is greater than a configured threshold and that the transmission priority value of the UL signalling is lower than a configured threshold, the terminal may determine that the transmission priority of the sidelink signalling is higher. Otherwise, the terminal may determine that the transmission priority of the UL signalling is higher. Here, it is assumed that the greater the transmission priority value, the higher the priority.

2. A Transmission Priority Value May Be Configured for UL Physical Signalling.

A transmission priority value may be configured for sidelink physical signalling. The terminal may compare the transmission priority value of the UL physical signalling with the transmission priority value of the sidelink physical signalling. If a plurality of UL physical signalling is included, the terminal may determine the transmission priority value of the UL physical signalling having the largest transmission priority value, among the plurality of UL physical signalling, to be an object to be compared. If a plurality of sidelink physical signalling is included, the terminal may determine the transmission priority value of the sidelink physical signalling having the largest transmission priority value, among the plurality of sidelink physical signalling, to be an object to be compared.

In the case of (2), the terminal may compare the sidelink signalling having the largest transmission priority value for at least one of the sidelink physical layer signalling and the sidelink packet to be transmitted with the UL signalling having the largest transmission priority value for at least one of the UL physical layer signalling and a UL packet to be transmitted. If it is determined that the transmission priority value of the sidelink signalling is greater than the transmission priority value of the UL signalling, the terminal may determine that the transmission priority of the sidelink signalling is higher. Otherwise, the terminal may determine that the transmission priority of the UL signalling is higher. Here, it is assumed that the greater the transmission priority value, the higher the priority.

3. A Separate Transmission Priority Value May Not Be Configured for UL Physical Signalling.

In this case, the transmission priority value of the UL physical signalling may be configured based on the transmission priority value of the UL packet (e.g., at least one of a data bearer logical channel, a signalling bearer logical channel, and a MAC CE) corresponding to the UL physical signalling. If there is a plurality of UL packets corresponding to the UL physical signalling, the priority value of the UL physical signalling may be configured based on the transmission priority value of a UL packet having the largest transmission priority value, among the plurality of UL packets.

A separate transmission priority value may not be configured for sidelink physical signalling. In this case, the transmission priority value of the sidelink physical signalling may be configured based on the transmission priority value of the sidelink packet (e.g., at least one of a data bearer logical channel, a signalling bearer logical channel, and a MAC CE) corresponding to the sidelink physical signalling. If there is a plurality of sidelink packets corresponding to the sidelink physical signalling, the priority value of the sidelink physical signalling may be configured based on the transmission priority value of a sidelink packet having the largest transmission priority value, among the plurality of sidelink packets.

In the case of (3), the terminal may compare the sidelink signalling having the largest transmission priority value for at least one of the sidelink physical layer signalling and the sidelink packet to be transmitted with a configured threshold, and may compare the UL signalling having the largest transmission priority value for at least one of the UL physical layer signalling and the UL packet to be transmitted with a configured threshold. If it is determined that the transmission priority value of the sidelink signalling is greater than a configured threshold and that the transmission priority value of the UL signalling is less than a configured threshold, the terminal may determine that the transmission priority of the sidelink signalling is higher. Otherwise, the terminal may determine that the transmission priority of the UL signalling is higher. Here, it is assumed that the greater the transmission priority value, the higher the priority.

The terminal may compare the sidelink signalling having the largest transmission priority value for at least one of the sidelink physical layer signalling and the sidelink packet to be transmitted with the UL signalling having the largest transmission priority value for at least one of the UL physical layer signalling and the UL packet to be transmitted. If it is determined that the transmission priority value of the sidelink signalling is greater than the transmission priority value of the UL signalling, the terminal may determine that the transmission priority of the sidelink signalling is higher. Otherwise, the terminal may determine that the transmission priority of the UL signalling is higher. Here, it is assumed that the greater the transmission priority value, the higher the priority.

4. A Separate Transmission Priority Value May Not Be Configured for UL Physical Signalling.

In this case, the transmission priority value of the UL physical signalling may be configured based on the transmission priority value of at least one of the sidelink packet (e.g., a data bearer logical channel, a signalling bearer logical channel, or a MAC CE) and/or the sidelink physical signalling. If there are one or more sidelink packets and/or sidelink physical signalling, the priority value of the UL physical signalling may be configured based on the transmission priority values of the sidelink packet and/or the sidelink physical signalling having the largest transmission priority value. If it is determined that the transmission priority values of the sidelink packet and/or the sidelink physical signalling are greater than a configured threshold, the terminal may determine that the transmission priority of the sidelink signalling is higher. Otherwise, the terminal may determine that the transmission priority of the UL is higher.

5. A Separate Transmission Priority Value May Not Be Configured for Sidelink Physical Signalling.

In this case, the transmission priority of the sidelink physical signalling may be configured based on the transmission priority value of at least one of the UL packet (e.g., at least one of a data bearer logical channel, a signalling bearer logical channel, and a MAC CE) and/or the UL physical signalling. If there is a plurality of UL packets and/or UL physical signalling, the transmission priority values of the UL packet and/or the UL physical signalling may be configured based on the transmission priority values of the UL packet and/or the UL physical signalling having the largest transmission priority value, among the plurality of UL packets and/or UL physical signals. If it is determined that the transmission priority values of the UL packet and/or the UL physical signalling are greater than a configured threshold, the terminal may determine that the transmission priority of the UL is higher. Otherwise, the terminal may determine that the transmission priority of the sidelink is higher.

A method of determining priority between UL physical signalling transmission through at least the PUSCH or the PUCCH and sidelink transmission may include at least one of the four (4) embodiments described below.

1. The Terminal May Determine Priority of UL Physical Signalling Transmission Based on Transmission Priority of a Sidelink Packet.

A transmission priority value of the sidelink packet may be configured in the terminal. If it is determined that the transmission priority of the sidelink packet is high (i.e., higher than a configured threshold), the terminal may process the sidelink packet prior to the UL physical signalling. If it is determined that the transmission priority of the sidelink packet is low (i.e., lower than a configured threshold), the terminal may preferentially process the UL physical signalling. In the embodiment described above, it is assumed that the greater the transmission priority value, the higher the priority.

2. The Terminal May Determine the Transmission Priority, Based on the Transmission Priority of a Sidelink Packet and the Transmission Priority of UL Physical Signalling.

A transmission priority value of the UL physical signalling and a transmission priority value of the sidelink packet may be configured in the terminal. If it is determined that the transmission priority of the sidelink packet is high (i.e., higher than a configured threshold), and if it is determined that the transmission priority of the UL physical signalling is lower than a configured threshold, the terminal may preferentially process the sidelink packet. Otherwise, the terminal may preferentially process the UL physical signalling. Alternatively, if it is determined that the transmission priority of the sidelink packet is lower than a configured threshold and the transmission priority of the UL physical signalling is higher than a configured threshold, the terminal may preferentially process the UL physical signalling. Otherwise, the terminal may preferentially process the sidelink packet. In the embodiment described above, it is assumed that the greater the transmission priority value, the higher the priority.

3. The Terminal May Determine Transmission Priority, Based on the Transmission Priority of a Sidelink Packet and the Transmission Priority of UL Physical Signalling.

A transmission priority value of the sidelink packet may be configured in the terminal. The transmission priority value of the UL physical signalling may be configured based on the transmission priority value of the UL packet related to the UL physical signalling. If it is determined that the transmission priority of the sidelink packet is high (i.e., higher than a configured threshold), and if it is determined that the transmission priority of the UL physical signalling is lower than a configured threshold, the terminal may preferentially process the sidelink packet. Otherwise, the terminal may preferentially process the UL physical signalling. Alternatively, if it is determined that the transmission priority of the sidelink packet is lower than a configured threshold and the transmission priority of the UL physical signalling is higher than a configured threshold, the terminal may preferentially process the UL physical signalling. Otherwise, the terminal may preferentially process the sidelink packet. In the embodiment described above, it is assumed that the greater the transmission priority value, the higher the priority.

4. The Terminal May Compare a Transmission Priority Value of a Sidelink Packet with a Transmission Priority Value of UL Physical Signalling, Thereby Determining Transmission Priority.

A transmission priority value of the sidelink packet may be configured in the terminal. A transmission priority value of the UL physical signalling may be configured in the terminal, and in the case where a transmission priority value of the UL physical signalling is not configured, the transmission priority value of the UL physical signalling may be configured based on the transmission priority value of the UL packet related to the UL physical signalling. If a plurality of sidelink packets is included, the terminal may compare transmission priority, based on the sidelink packet having the largest transmission priority value, among the plurality of sidelink packets. If there is a plurality of UL physical signalling, the terminal may compare transmission priority, based on the UL physical signalling having the largest transmission priority value, among the plurality of UL physical signalling. If it is determined that the transmission priority value of the sidelink packet is greater than the transmission priority value of the UL physical signalling as a result of comparing the same, the terminal may preferentially process the sidelink packet. Otherwise, the terminal may preferentially process the UL physical signalling.

The four (4) embodiments of determining priority between UL physical signalling transmission through at least the PUSCH or the PUCCH and sidelink transmission, described above, may be implemented as a method of determining the priority of UL physical signalling transmission at least through the PUSCH, or the PUCCH and sidelink HARQ feedback signalling transmission. The transmission priority value of the sidelink HARQ feedback signalling may be configured based on the transmission priority value of the sidelink packet corresponding to the sidelink HARQ feedback. If there is a plurality of logical channels of the sidelink packet corresponding to the sidelink HARQ feedback, the transmission priority value of the sidelink HARQ feedback signalling may be configured based on the transmission priority value of the sidelink packet corresponding to the logical channel having the largest transmission priority value, among the plurality of logical channels. Here, it is assumed that the greater the transmission priority value, the higher the priority.

A method of determining priority between UL physical signalling transmission, and UL physical signalling transmission related to side packet transmission, which are performed through a PUSCH or a PUCCH, may include at least one of the embodiments described below.

The UL physical signalling related to the sidelink packet transmission may include control information transmitted to the base station as information on sidelink communication, and, for example, may include at least one piece of information on an SR for sidelink communication or information on HARQ ACK/NACK for the sidelink packet. For example, in the case of determining the priority of the SR for the sidelink packet transmission and the SR for the UL packet transmission through the PUSCH or the PUCCH, at least one of the embodiments described below may be performed.

This method may be applied to the case in which a transmission priority value is configured for the UL physical signalling transmission, which is transmitted in the PUSCH or the PUCCH, and/or the case in which a transmission priority value is not configured for the UL physical signaling transmission. This method may be applied to the case in which a transmission priority value is configured for the UL physical signalling related to the sidelink packet transmission and/or the case in which a transmission priority value is not configured for the UL physical signalling transmission related to side packet transmission.

The following six (6) cases will be discussed:

1. The case in which a transmission priority value is configured for UL physical signalling transmission.
2. The case in which a transmission priority value is able to be configured for UL physical signalling transmission, based on the transmission priority of the UL packet (e.g., a data bearer logical channel, a signalling bearer logical channel, or a MAC CE) corresponding to a UL physical signalling transmission, even though a transmission priority value has not been configured for a UL physical signalling transmission.
3. The case in which a transmission priority value is not configured for UL physical signalling transmission.
4. The case in which a transmission priority value is configured for UL physical signalling transmission related to side packet transmission.
5. The case in which a transmission priority value is able to be configured for UL physical signalling transmission related to side packet transmission, based on the transmission priority of the UL packet (e.g., a data bearer logical channel, a signalling bearer logical channel, or a MAC CE) corresponding to UL physical signalling transmission related to side packet transmission, even though a transmission priority value has not been configured for UL physical signalling transmission related to side packet transmission.
6. The case in which a transmission priority value is not configured for UL physical signalling transmission related to side packet transmission.

Among the cases 1 to 6, above, in the case where it is possible to determine transmission priority for UL physical signalling transmission, and UL physical signalling transmission related to side packet transmission, based on the transmission priority values, for example, in the case of a combination of cases 1 and 3, a combination of cases 1 and 4, a combination of cases 2 and 3, or a combination of cases 2 and 4, the transmission priority of UL physical signalling transmission, and UL physical signalling transmission related to side packet transmission, may be determined by comparing the same with a threshold configured for UL physical signalling transmission and a threshold configured for UL physical signalling transmission related to side packet transmission.

If it is determined that the transmission priority value of UL physical signalling transmission is greater than a configured threshold and that the transmission priority value of UL physical signalling transmission related to side packet transmission is less than a configured threshold, the terminal may determine to preferentially process UL physical signalling transmission. Otherwise, the terminal may determine to preferentially process UL physical signalling transmission related to side packet transmission. Here, it is assumed that the greater the transmission priority value, the higher the transmission priority.

The transmission priority of UL physical signalling transmission and UL physical signalling transmission related to side packet transmission may be determined by comparing the transmission priority value of UL physical signalling transmission with the transmission priority value of UL physical signalling transmission related to side packet transmission. If it is determined that the transmission priority value of UL physical signalling transmission is greater than the transmission priority value of UL physical signalling transmission related to side packet transmission, the terminal may preferentially process UL physical signalling transmission. Otherwise, the terminal may preferentially process UL physical signalling transmission related to side packet transmission.

Among the cases 1 to 6, above, in the case where it is impossible to determine transmission priority for one of either UL physical signalling transmission or UL physical signalling transmission related to side packet transmission, based on the transmission priority values, for example, in the case of a combination of cases 1 and 6, a combination of cases 2 and 6, a combination of cases 3 and 4, or a combination of cases 3 and 5, the terminal may compare the transmission priority value with a configured threshold, based on the link capable of configuring the transmission priority value, thereby determining priority processing of the transmission. Here, "priority processing" or "preferentially process" indicates an operation of preferentially transmitting a packet having high transmission priority according to the identified priority.

In the case where the transmission priority value is able to be determined for UL physical signalling transmission, if it is determined that the transmission priority value of UL physical signalling transmission is greater than a configured threshold, the terminal may preferentially process UL physical signalling transmission. Otherwise, the terminal may preferentially process UL physical signalling transmission related to side packet transmission.

In the case where the transmission priority value is able to be determined for UL physical signalling transmission related to side packet transmission, if it is determined that the transmission priority value of UL physical signalling transmission related to side packet transmission is greater than a configured threshold, the terminal may preferentially process UL physical signalling transmission related to side packet transmission. Otherwise, the terminal may preferentially process UL physical signalling transmission.

Among the cases 1 to 6, above, in the case where it is impossible to determine transmission priority for UL physical signalling transmission and UL physical signalling transmission related to side packet transmission, based on the transmission priority values, for example, in the case of a combination of cases 3 and 6, the terminal may arbitrarily determine priority processing of the transmission for UL physical signalling transmission and UL physical signalling transmission related to side packet transmission.

The priority between a UL BSR MAC CE transmitted through the UL and an SL BSR MAC CE transmitted through the UL may be determined according to the following four (4) operations:

1. A transmission priority value may be separately configured for the UL BSR MAC CE.
2. A transmission priority value may be separately configured for the SL BSR MAC CE.
3. If a transmission priority value is not separately configured for the UL BSR MAC CE, the transmission priority of the UL BSR MAC CE may be configured based on the transmission priority value of the logical channel reported by the UL BSR MAC CE. If information about a plurality of logical channels is included in one UL BSR MAC CE, the transmission priority of the corresponding UL BSR MAC CE may be configured based on the transmission priority value of the largest logical channel among the plurality of logical channels.
4. If a transmission priority value is not separately configured for the SL BSR MAC CE, the transmission priority of the SL BSR MAC CE may be configured based on the transmission priority value of the logical channel reported by the SL BSR MAC CE. If information about a plurality of logical channels is included in one SL BSR MAC CE, the transmission priority of the corresponding SL BSR MAC CE may be configured based on the transmission priority value of the logical channel having the largest transmission priority among the plurality of logical channels.

The terminal may determine the transmission priority between the UL BSR MAC CE transmitted through the UL and the SL BSR MAC CE transmitted through the UL according to at least one of the following four (4) embodiments.

1. The Terminal May Compare the Transmission Priority Value of the UL BSR MAC CE and the Transmission Priority Value of the SL BSR MAC CE.

If the transmission priority value of the UL BSR MAC CE is greater than the transmission priority value of the SL BSR MAC CE, the terminal may preferentially process the UL BSR MAC CE. Otherwise, the terminal may preferentially process the SL BSR MAC CE.

2. The Terminal May Compare the Transmission Priority Value of the UL BSR MAC CE with a Configured Threshold and Compare the Transmission Priority Value of the SL BSR MAC CE with a Configured Threshold.

The above thresholds may be configured as the same value or different values. If it is determined that the transmission priority value of the UL BSR MAC CE is greater than a threshold and that the transmission priority value of the SL BSR MAC CE is less than a threshold, the terminal may preferentially process the UL BSR MAC CE. Otherwise, the terminal may preferentially process the SL BSR MAC CE.

3. The Terminal May Compare the Transmission Priority Value of the UL BSR MAC CE with a Configured Threshold.

If it is determined that the transmission priority value of the UL BSR MAC CE is greater than a threshold, the terminal may preferentially process the UL BSR MAC CE. Otherwise, the terminal may preferentially process the SL BSR MAC CE.

4. The Terminal May Compare the Transmission Priority Value of the SL BSR MAC CE with a Configured Threshold.

If it is determined that the transmission priority value of the SL BSR MAC CE is greater than a threshold, the terminal may preferentially process the SL BSR MAC CE. Otherwise, the terminal may preferentially process the UL BSR MAC CE.

An operation method of a terminal in a wireless communication system may include a step of determining priority between UL data and sidelink data; a step of transmitting one of the UL data and the sidelink data, which has high priority; and a step of dropping the remaining one of the UL data and the sidelink data or transmitting the same at a lower transmission power than that in the case where the remaining one of the UL data and the sidelink data is determined to have a high priority.

If the UL data includes a PUCCH, the UL data may be determined to be the data having a high priority.

If the UL data does not include data other than a MAC CE, the UL data may be determined to be the data having a high priority.

If the UL data does not include data other than a MAC CE, the sidelink data may be determined to be the data having a high priority.

If the UL data does not include data other than a MAC CE, and if the MAC CE belongs to a predefined group, the UL data may be determined to be the data having a high priority.

If the UL data does not include data other than a MAC CE, and if a priority value of the sidelink data exceeds a threshold, the sidelink data may be determined to be the data having a high priority.

If the UL data includes a MAC CE, the sidelink data may be determined to be the data having a high priority.

If the UL data includes a MAC CE, the UL data may be determined to be the data having a high priority.

A terminal in a wireless communication system may include a transceiver and at least one processor connected to the transceiver, wherein the at least one processor may be configured to determine priority between UL data and sidelink data, transmit one of the UL data and the sidelink data, which has a high priority, and drop the remaining one of the UL data and the sidelink data or transmit the same at a lower transmission power than in the case where the remaining one of the UL data and the sidelink data is determined to have a high priority.

If the UL data includes a PUCCH, the UL data may be determined to be the data having a high priority.

If the UL data does not include data other than a MAC CE, the UL data may be determined to be the data having a high priority.

If the UL data does not include data other than a MAC CE, the sidelink data may be determined to be the data having a high priority.

If the UL data does not include data other than a MAC CE, and if the MAC CE belongs to a predefined group, the UL data may be determined to be the data having a high priority.

If the UL data does not include data other than a MAC CE, and if a priority value of the sidelink data exceeds a threshold, the sidelink data may be determined to be the data having a high priority.

If the UL data includes a MAC CE, the sidelink data may be determined to be the data having a high priority.

If the UL data includes a MAC CE, the UL data may be determined to be the data having a high priority.

The UL data may include a first BSR MAC CE, the sidelink data may include a second BSR MAC CE, and the UL data and the sidelink data may be determined based on a priority value of first data to be transmitted in the UL through a resource allocated in response to the first BSR and a priority value of second data to be transmitted in the sidelink through a resource allocated in response to the second BSR.

Methods of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The one or more program may include instructions that cause the electronic device to perform the methods according to an embodiment of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Any combination of some or all of them may form a memory in which the program is stored. Further, a plurality of such memories may be included in the electronic device.

In addition, the programs may be stored in an attachable storage device which is accessible through communication networks such as the Internet, Intranet, a local area network (LAN), a wide area network (WAN), a storage area network (SAN), or a combination thereof. Such a storage device may access the electronic device via an external port. Further, a separate storage device on the communication network may access a portable electronic device.

A component included in the present disclosure is expressed in the singular or the plural according to example embodiments. However, the singular form or plural form is selected for convenience of description suitable for the presented situation, and an embodiment of the present disclosure are not limited to a single element or multiple elements thereof. Further, either multiple elements expressed in the description may be configured into a single element or a single element in the description may be configured into multiple elements.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An operation method of a terminal in a wireless communication system, the method comprising:
   identifying a priority between uplink (UL) data and sidelink data;
   transmitting at least one of the UL data or the sidelink data based on the identified priority;
   in case that the terminal is not capable of simultaneous transmissions of the UL data and the sidelink data, transmitting a first data having a higher priority between the UL data and the sidelink data based on the identified priority; and
   in case that the terminal is unable to simultaneously transmit the UL data and the sidelink data with a predetermined transmission power, transmitting a second data using a first transmission power and a third data having a lower priority between the UL data and the sidelink data using a second transmission power, wherein the second transmission power is low power identified based on the lower priority and a total of the first transmission power and the second transmission power does not exceed a maximum transmission power,
   wherein the priority of the UL data and the sidelink data is identified based on at least one of a logical channel of the UL data and the sidelink data, and wherein a logical channel for a medium access control (MAC) control element (CE) for buffer status report (BSR) with exception of BSR included for padding has a higher priority than a logical channel for a MAC CE for sidelink BSR with exception of sidelink BSR included for padding,
   wherein the logical channel for the MAC CE for the sidelink BSR with exception of the sidelink BSR included for padding has a higher priority than a logical channel for a MAC CE for UL BSR included for padding, and
   wherein the logical channel for the MAC CE for the UL BSR included for padding has a higher priority than a logical channel for a MAC CE for the sidelink BSR included for padding.

2. The method of claim 1, wherein identifying the priority further comprises:
   identifying that a priority of the UL data is higher than a priority of the sidelink data, if a priority value of the UL data is lower than a first configured threshold, and
   identifying that the priority of the sidelink data is higher than the priority of the UL data, if a priority value of the sidelink data is lower than a second configured threshold.

3. The method of claim 2, wherein the first configured threshold, and the second configured threshold are configured to the terminal.

4. The method of claim 2, wherein the priority value of the UL data configured to the terminal has one of 16 values, and wherein the priority value of the sidelink data configured to the terminal has one of 8 values.

5. The method of claim 2, wherein the priority value of the UL data is a priority value of a logical channel having a highest priority among at least one logical channel associated with the UL data, and wherein the priority value of the sidelink data is a priority value of a logical channel having a highest priority among at least one logical channel associated with the sidelink data.

6. The method of claim 5, wherein a decreasing priority value indicates a higher priority.

7. The method of claim 1, wherein the second transmission power is lower than the maximum output power minus the first transmission power.

8. The method of claim 1, wherein the priority between UL data and sidelink data is identified based on a priority of a scheduling request, and wherein the scheduling request is used to request to a base station for at least one UL resource for UL transmission or for at least one sidelink resource for sidelink transmission.

9. The method of claim 8, wherein the priority of the scheduling request for the at least one UL resource for the UL transmission is identified based on a priority of a logical channel associated with the scheduling request, and wherein the priority of the scheduling request for the at least one sidelink resource for the sidelink transmission is identified based on the priority of the logical channel associated with the scheduling request.

10. A terminal in a wireless communication system, the terminal comprising:

a transceiver; and a processor coupled with the transceiver and configured to:

identify a priority between uplink (UL) data and sidelink data;

transmit at least one of the UL data or the sidelink data based on the identified priority;

wherein the processor is further configured to:

in case that the terminal is not capable of simultaneous transmissions of the UL data and the sidelink data, transmit a first data having a higher priority between the UL data and the sidelink data based on the identified priority;

in case that the terminal is unable to simultaneously transmit the UL data and the sidelink data with a predetermined transmission power, transmit a second data using a first transmission power and a third data having a lower priority between the UL data and the sidelink data using a second transmission power, wherein the second transmission power is low power identified based on the lower priority and a total of the first transmission power and the second transmission power does not exceed a maximum transmission power, wherein the priority of the UL data and the sidelink data is identified based on at least one of a logical channel of the UL data and the sidelink data, and wherein a logical channel for a medium access control (MAC) control element (CE) for buffer status report (BSR) with exception of BSR included for padding has a higher priority than a logical channel for a MAC CE for sidelink BSR with exception of sidelink BSR included for padding, wherein the logical channel for the MAC CE for the sidelink BSR with exception of the sidelink BSR included for padding has a higher priority than a logical channel for a MAC CE for UL BSR included for padding, and wherein the logical channel for the MAC CE for the UL BSR included for padding has a higher priority than a logical channel for a MAC CE for the sidelink BSR included for padding.

11. The terminal of claim 10, wherein the processor is further configured to:

identify that a priority of the UL data is higher than a priority of the sidelink data, if the priority value of the UL data is lower than a first configured threshold, and identify that the priority of the sidelink data is higher than the priority of the UL data, if the priority value of the sidelink data is lower than a second configured threshold.

12. The terminal of claim 11, wherein the first configured threshold and the second configured threshold are configured to the terminal.

13. The terminal of claim 11, wherein the priority value of the UL data configured to the terminal has one of 16 values, and wherein the priority value of the sidelink data configured to the terminal has one of 8 values.

14. The terminal of claim 11, wherein the priority value of the UL data is a priority value of a logical channel having a highest priority among at least one logical channel associated with the UL data, and wherein the priority value of the sidelink data is a priority value of a logical channel having a highest priority among at least one logical channel associated with the sidelink data.

15. The terminal of claim 14, wherein a decreasing priority value indicates a higher priority.

16. The terminal of claim 10, wherein the second transmission power is lower than the maximum output power minus the first transmission power.

17. The terminal of claim 10, wherein the priority between UL data and sidelink data is identified based on a priority of a scheduling request, and wherein the scheduling request is used to request a base station for at least one UL resource for UL transmission or for at least one sidelink resource for sidelink transmission.

18. The terminal of claim 17, wherein the priority of the scheduling request for the at least one UL resource for the UL transmission is identified based on a priority of a logical channel associated with the scheduling request, and wherein the priority of the scheduling request for the at least one sidelink resource for the sidelink transmission is identified based on the priority of the logical channel associated with the scheduling request.

* * * * *